US 6,603,085 B2

(12) United States Patent
Oya et al.

(10) Patent No.: US 6,603,085 B2
(45) Date of Patent: Aug. 5, 2003

(54) TRANSPARENT CONDUCTIVE FILM, TRANSPARENT CONDUCTIVE SHEET AND TOUCHPANEL

(75) Inventors: Toshiyuki Oya, Otsu (JP); Yoshiharu Morihara, Otsu (JP); Katsuya Ito, Otsu (JP); Syunji Kurahara, Otsu (JP); Yasushi Aikawa, Otsu (JP); Hiroyuki Nagahama, Otsu (JP); Seiichiro Yokoyama, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 128 days.

(21) Appl. No.: 09/816,308

(22) Filed: Mar. 26, 2001

(65) Prior Publication Data
US 2001/0037935 A1 Nov. 8, 2001

(30) Foreign Application Priority Data

Mar. 28, 2000 (JP) ........................ 2000-089425
Aug. 3, 2000 (JP) ........................ 2000-236007
Nov. 27, 2000 (JP) ........................ 2000-359690

(51) Int. Cl.$^7$ .......................... G02F 1/1339; H01H 9/00
(52) U.S. Cl. ....................... 200/512; 200/310; 349/122; 428/423.1
(58) Field of Search ................. 200/512–517, 200/600, 310–317; 428/412, 413, 414, 416, 429, 423.1, 447, 448, 450, 451, 500, 522, 703; 359/40, 41, 51, 70, 95, 265, 267, 268, 272–274; 349/122

(56) References Cited

U.S. PATENT DOCUMENTS

| 5,328,745 | A | | 7/1994 | Kurihara et al. | ............ 428/141 |
| 5,477,351 | A | * | 12/1995 | Takahara et al. | ............ 349/201 |
| 5,633,079 | A | | 5/1997 | Shoshi et al. | ............ 428/323 |
| 6,136,444 | A | * | 10/2000 | Kon et al. | ............ 349/122 |
| 6,395,209 | B2 | * | 5/2002 | Yoshida et al. | ............ 264/137 |
| 6,437,901 | B1 | * | 8/2002 | Kobayashi et al. | ......... 252/586 |

FOREIGN PATENT DOCUMENTS

| JP | 60-131711 | 7/1985 | ............ H01B/5/14 |
| JP | 61-79647 | 4/1986 | ............ B32B/9/00 |
| JP | 61-183809 | 8/1986 | ............ H01B/5/14 |
| JP | 2-5308 | 1/1990 | ............ H01B/5/14 |
| JP | 2-194943 | 8/1990 | ............ B32B/9/00 |
| JP | 2-276630 | 11/1990 | ............ B32B/9/00 |
| JP | 7-314628 | 12/1995 | ............ B32B/27/36 |
| JP | 8-64034 | 3/1996 | ............ H01B/5/14 |
| JP | 2000-62074 | 2/2000 | ............ B32B/7/02 |
| JP | 2000-94592 | 4/2000 | ............ B32B/27/20 |
| WO | WO 99/59814 | 11/1999 | ............ B32B/7/02 |

* cited by examiner

Primary Examiner—Michael Friedhofer
(74) Attorney, Agent, or Firm—Morrison & Foerster LLP

(57) ABSTRACT

A transparent conductive film has a cured layer mainly containing a curable resin and a transparent conductive thin film successively layered on a transparent plastic film base. The transparent conductive film is characterized in that it has 3–200 protrusions over the surface of the transparent conductive thin film per 100 $\mu m^2$, each having a diameter of 0.05–3.0 $\mu m$ and a height of 0.005–2.00 $\mu m$. The transparent conductive film is characterized in that a volatile component amount contained in the transparent conductive film is at most 30 Pa.

12 Claims, 9 Drawing Sheets

TRANSPARENT CONDUCTIVE FILM, TRANSPARENT CONDUCTIVE SHEET AND TOUCHPANEL

BACKGROUND OF THE INVENTION

1. Field of the Invention

The present invention relates to a transparent conductive film or transparent conductive sheet with a cured layer and transparent conductive thin film successively layered on a transparent plastic film base as well as a touchpanel using the same. More particularly, the present invention relates to a transparent conductive film or transparent conductive sheet with excellent resistance to pen sliding when used for a touchpanel for pen input as well as a touchpanel using the same.

2. Description of the Background Art

Transparent conductive films with a transparent thin film having small resistance layered on a transparent plastic film base are widely used in electrical and electronic fields, e.g., in a flat panel display such as a liquid crystal display or an electroluminescence (EL) display and a transparent electrode for a touchpanel.

Recently, due to a proliferation of portable information terminals, notebook computers with touchpanels and the like, the demand for a touchpanel with excellent resistance to pen sliding has been on the increase.

When input is made to a touchpanel by a pen, transparent conductive thin films on the sides of a fixed electrode and a movable electrode (film electrode) are brought into contact. Therefore, a transparent conductive film with excellent resistance to pen sliding is required which has sufficient resistance to a load applied by the pen to prevent cracks, separation and the like.

However, a conventional transparent conductive film suffers from the following problem.

A transparent conductive film (Japanese Patent Laying-Open No. 2-66809) has been proposed having a transparent conductive thin film on a transparent plastic film base with a thickness of 120 μm or smaller applied to another transparent base by a tackifier layer. However, after a 100,000 linear-sliding test with a load of 5.0N using a polyacetal pen, which will later be described in conjunction with a sliding-resistance test, it was found that separation was caused to the transparent conductive thin films and resistance to pen input was unsatisfactory. Due to whitening of the separated portion, a display quality decreases when used for a display with a touchpanel.

A transparent conductive film with a layer formed by hydrolysis of an organosilicon compound on a transparent plastic film base and further having a crystalline transparent conductive thin film layered thereon has been proposed for example in Japanese Patent Laying-Open No. 60-131711, No. 61-79647, No. 61-183809, No. 2-194943, No. 2-276630, and No. 8-64034.

However, such a transparent conductive film is extremely fragile because of its crystallinity and small thickness. Thus, after a 100,000 linear-sliding test with a load of 5.0N using a polyacetal pen which will later be described in conjunction with a sliding-resistance test, cracks are caused to the transparent conductive thin film. In addition, since a thermal treatment at about 150° C. is required after sputtering the transparent conductive thin film, such a film involves high process cost.

Further, a conductive plastic layer stack with a transparent conductive thin film formed on a curable coating layer has been proposed in Japanese Patent Laying-Open No. 2-5308 and No. 2000-62074. However, although the layer stack is sufficient for use as a transparent electrode of a liquid crystal display, it does not have sufficient sliding-resistance when used for a touchpanel. This is because a residual volatile component is gasified from the cured coating layer during fabrication of the transparent conductive thin film, whereby the quality of the transparent conductive thin film decreases.

SUMMARY OF THE INVENTION

In view of the above, an object of the present invention is to provide a transparent conductive film or a transparent conductive sheet which exhibits excellent resistance to pen input when used for a touchpanel and, in particular, which prevents breakage of a the transparent conductive thin film even after a 100,000 sliding test with a load of 5.0N using a polyacetal pen which will later be described in conjunction with a sliding-resistance test, as well as a touchpanel using the same. The transparent conductive film, transparent conductive sheet and touchpanel of the present invention which solve the aforementioned problem are set forth in the following.

Namely, the present invention is a transparent conductive film having a cured layer mainly containing a curable resin and a transparent conductive thin film successively layered on a transparent plastic film base, which is characterized in that 3–200 protrusions, each having a diameter of 0.05–3.0 μm and a height of 0.005–2.00 μm, are formed per 100 μm² over a surface of the transparent conductive thin film.

According to another aspect of the present invention, the transparent conductive film is characterized in that the curable resin is an ultraviolet-curable resin, a resin which is insoluble with the ultraviolet-curable resin is a polyester resin having an average molecular weight of 5,000–50,000, and the polyester resin is contained in an amount of 0.10–20 parts by weight with respect to 100 parts of the ultraviolet-curable resin.

According to another aspect of the present invention, the transparent conductive film is characterized in that the transparent conductive thin film is formed of an indium-tin oxide compound or a tin-antimony oxide compound.

According to another aspect of the present invention, the transparent conductive film is characterized in that a hardcoat layer is formed on the transparent conductive film on the side opposite the transparent conductive thin film.

According to another aspect of the present invention, the transparent conductive film is characterized in that the hardcoat layer has an anti-glare effect.

According to another aspect of the present invention, the transparent conductive film is characterized in that the hardcoat layer is subjected to a treatment for low reflection.

According to another aspect of the present invention, the transparent conductive sheet is characterized in that a transparent resin sheet is applied to the transparent conductive film by a tackifier on the side opposite the transparent conductive thin film.

According to another aspect of the present invention, in a touchpanel having a pair of panel plates with the transparent conductive thin films arranged through a spacer such that the transparent conductive films are opposite each other, the touchpanel is characterized in that at least one panel plate is formed of the above mentioned transparent conductive film or transparent conductive sheet.

The foregoing and other objects, features, aspects and advantages of the present invention will become more apparent from the following detailed description of the present invention when taken in conjunction with the accompanying drawings.

DESCRIPTION OF THE PREFERRED EXAMPLES

Figure 1:
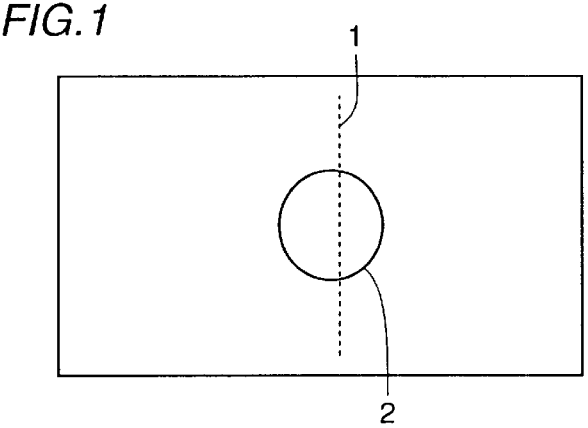
FIGS. 1 to 8 are diagrams respectively showing output shapes from a touchpanel according to first to eighth examples of the present invention.
Figure 2:
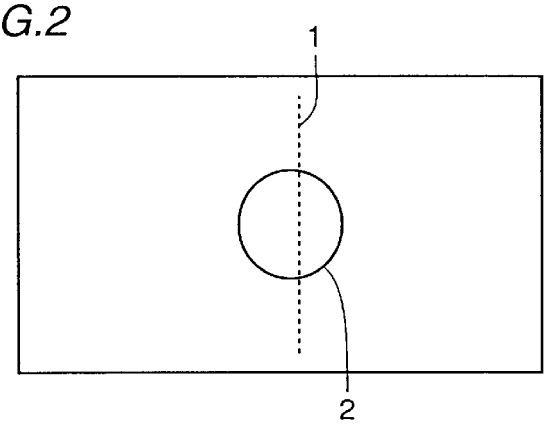
Figure 3:
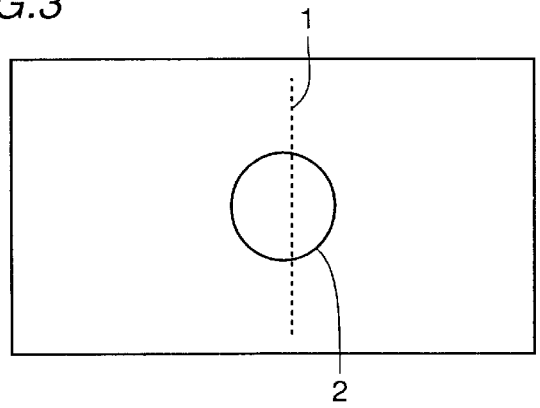
Figure 4:
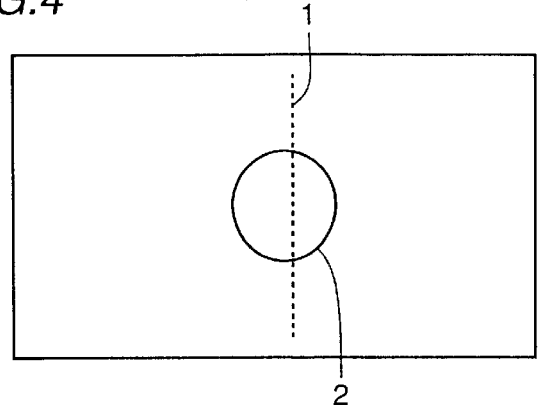
Figure 5:
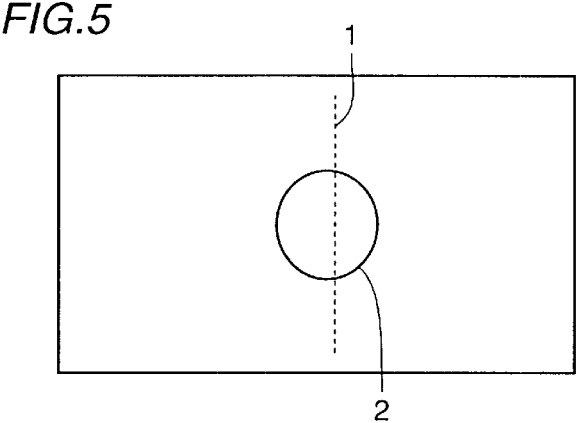
Figure 6:
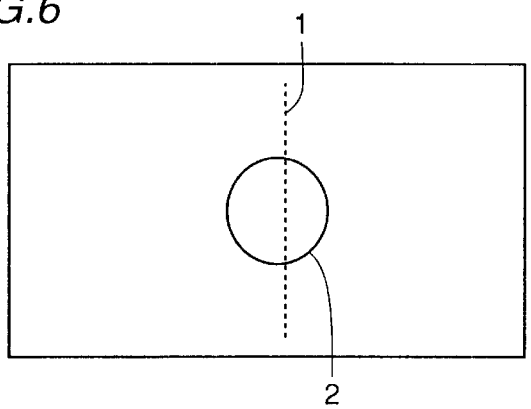
Figure 7:
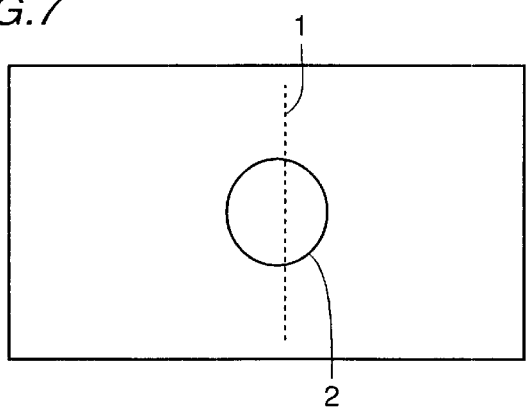
Figure 8:
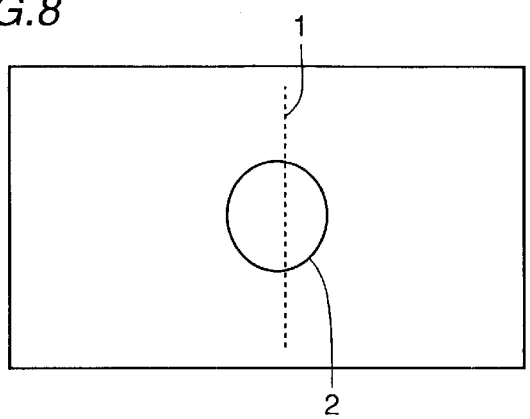
Figure 9:
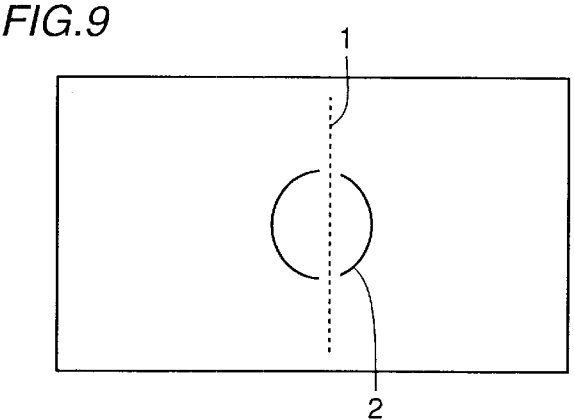
FIGS. 9 to 12 are diagrams respectively showing output shapes from a touchpanel according to first to fourth comparative examples.
Figure 10:
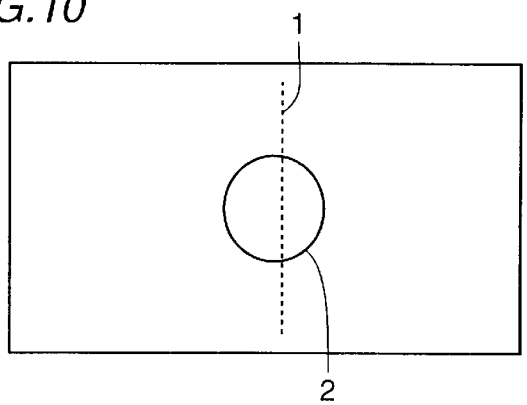
Figure 11:
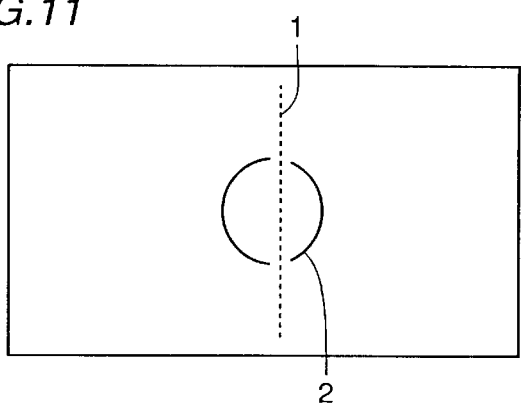
Figure 12:
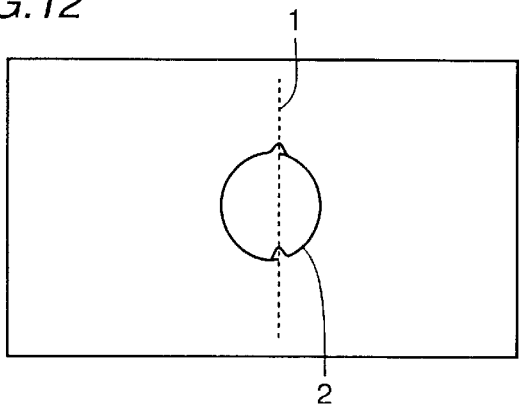

A transparent plastic film base used in the present invention refers to a film obtained by melt-extruding or solution-extruding an organic polymer and performing drawing, cooling and thermosetting in a longitudinal direction and/or a width direction as necessary. Examples of organic polymer include polyethylene, polypropylene, polyethylene terephthalate, polyethylene-2, 6-naphthalate, polypropylene terephthalate, nylon 6, nylon 4, nylon 66, nylon 12, polyimide, polyamide-imide, polyether sulfin, polyether ether ketone, polycarbonate, polyarylate, cellulose propionate, polyvinyl chloride, polyvinylidene chloride, polyvinyl alcohol, polyether imide, polyphenylene sulfide, polyphenylene oxide, polystyrene, syndiotactic polystyrene, and norbornene polymer.

Most preferably, among these organic polymers, polyethylene terephthalate, polypropylene terephthalate, polyethylene-2, 6-naphthalate, syndiotactic polystyrene, norbornene polymer, polycarbonate, polyarylate or the like is used. Any of these organic polymers may be a copolymer obtained by copolymerization with a small amount of another monomer, or a blend with another organic polymer.

A thickness of a transparent plastic film base of the present invention is preferably more than 10 µm and not more than 300 µm and, in particular, a thickness of 70–260 µm is preferable. If the thickness of the plastic film is 10 µm or smaller, a mechanical strength is insufficient. In this case, particularly, deformation caused by pen input when used for a touchpanel is too large to provide sufficient durability. On the contrary, if the thickness exceeds 300 µm, a pen load for deforming a film is too great when used for the touchpanel, which is not preferable.

The transparent plastic film base used for the present invention may be subjected to a surface activation treatment such as corona discharge, glow discharge, flame treatment, ultraviolet treatment, electronic treatment, or ozonation treatment insofar as it does not adversely affect the object of the present invention.

Although the curable resin used in the present invention is not particularly limited insofar as it is curable by application of energy for example from heating, ultraviolet ray irradiation, electronic irradiation and the like, a resin which is curable by ultraviolet rays is preferable in terms of productivity. Examples of such ultraviolet-curable resin include a polyfunctional acrylate resin such as acrylic acid or methacrylic acid ester of polyvalent alcohol, diisocyanate, polyvalent alcohol, and polyfunctional urethane acrylate resin synthesized by hydroxyalkyl ester of acrylic acid or methacrylic acid. Any of these polyfunctional resins may be copolymerized with monofunctional monomer, e.g., vinyl pyrrolidone, methyl methacrylate, styrene or the like.

The ultraviolet-curable resin is generally used with a photo polymerization initiator added thereto. For the photo polymerization initiator, a known compound which absorbs ultraviolet rays to generate radicals can be used without any particular limitation. Examples of photo polymerization initiator include various benzoins, phenyl ketones, and benzophenones. The photo polymerization initiator is generally added in an amount of 1.0–5.0 parts by weight with respect to 100 parts of ultraviolet-curable resin.

The cured layer used in the present invention preferably contains a resin insoluble with the curable resin in combination with the curable resin of a main component. Addition of a small amount of resin insoluble with the curable resin of a matrix causes phase separation in the curable resin and dispersion of the resin insoluble with the curable resin as particles. The dispersed particles of the insoluble resin can provide irregularities over the cured surface.

If the curable resin is an ultraviolet-curable resin, a polyester resin, polyolefin resin, polystyrene resin, and polyamide resin can be enumerated as the insoluble resin.

The polyester resin preferably has a high average molecular weight of 5,000–50,000, and more particularly 8,000–30,000. If the average molecular weight of the polyester resin is smaller than 5,000, it becomes difficult to disperse the polyester resin in the cured layer with an appropriate particle size. On the other hand, if the average molecular weight of the polyester resin exceeds 50,000, solubility with respect to a solvent decreases in preparing a coating liquid, which is not preferable.

The above mentioned polyester resin of high molecular weight is an amorphous saturation polyester resin obtained by copolymerizing dihydric alcohol and dihydric carboxylic acid, which is soluble in the solvent common to the above mentioned ultraviolet-curable resin.

Examples of the above dihydric alcohol include ethylene glycol, propylene glycol, 1,3-butanediol, 1,4-butanediol, 1,6-hexanediol, diethylene glycol, neopentyl glycol, 1,4-cyclohexanedimethanol, and hydrogenation bisphenol A.

Examples of the above dihydric carboxylic acid include isophthalic acid, terephthalic acid, adipic acid, phthalic anhydride, tetrahydro anhydrous phthalic acid, and hexahedron anhydrous phthalic acid.

Insofar as insufficiency of insolubility with respect to the solvent is not caused, alcohol of at least trivalence such as trimethylol propane and pentaerythritol, and carboxylic acid having at least trivalence such as anhydride trimellitic acid or anhydrous pyromellitic acid can be copolymerized.

In the present invention, as for the blending amount of the ultraviolet-curable resin and polyester resin of high molecule amount which are main components of the cured layer, the polyester resin is preferably contained in an amount of 0.10–20 parts by weight with respect to 100 parts of the ultraviolet-curable resin, and more preferably contained in an amount of 0.20–10 parts by weight and particularly preferably 0.50–5.0 parts by weight. If the blending amount of the polyester resin is smaller than 0.10 parts by weight with respect to 100 parts of the ultraviolet-curable resin, the number of protrusions formed over the surface of the cured layer becomes too small, which is not preferable. On the other hand, because of the difference in refractive index of the polyester resin and the ultraviolet-curable resin, if the blending amount of the polyester resin exceeds 20 parts by weight with respect to 100 parts of the ultraviolet-curable resin, the haze value of the cured layer tends to be higher and transparency may be deteriorated, which is not preferable. Conversely, by positively utilizing deterioration of transparency due to dispersed particles in the polyester resin of high molecular weight, a film with a high haze value can be used as an anti-glare film.

The above mentioned ultraviolet-curable resin, photo polymerization initiator, and polyester resin of high molecular weight are dissolved in the same solvent to prepare a coating liquid. Although not particularly limited, the solvent employed may be any of alcohols including ethyl alcohol and isopropyl alcohol, acetic ether, esters including butyl acetate, ethers including dibutyl ether, ethylene glycol monoethyl ether, ketones including methyl isobutyl ketone and cyclohexanone, and aromatic hydrocarbons including toluene, xylene and solvent naphtha, which may be used independently or in combination. The concentration of the resin in the coating liquid may be appropriately selected in consideration of viscosity according to a coating method or the like. For example, the total amount of the ultraviolet-curable resin, photo polymerization initiator and polyester resin of high molecular weight is 20–80% by weight of the coating liquid. In addition, other known additives, e.g., silicone leveling agent or the like may be added to the coating liquid as necessary.

In the present invention, the prepared coating liquid is applied to the transparent plastic film base. Although not particularly limited, examples of coating method include barcode method, gravure coating method, reverse coating method or the like, which is conventionally known. The applied coating liquid evaporates in the following drying step and is removed. In this step, the polyester resin of high molecular weight evenly dissolved in the coating liquid turns to fine particles to precipitate in the ultraviolet-curable resin. After the coating is dried, ultraviolet rays are further directed to the plastic film, and the ultraviolet-curable resin is crosslinked and cured to form a cured layer. In this curing step, the fine particles of the polyester resin of high molecular weight are set in a hardcoat layer to form protrusions over the surface of the cured layer.

The thickness of the cured layer is preferably 0.10–15 $\mu$m, more preferably 0.50–10 $\mu$m, and particularly preferably 1.0–8.0 $\mu$m. If the thickness of the cured layer is less than 0.10 $\mu$m, protrusions which will later be described may be unsatisfactory. On the other hand, the thickness exceeding 15 $\mu$m is not preferable in terms of productivity.

Although not particularly limited insofar as it is a material having both transparency and conductivity, as a transparent conductive thin film of the present invention, an indium oxide, tin oxide, zinc oxide, indium-tin oxide compound, tin-antimony oxide compound, zinc-aluminum oxide compound, indium-zinc oxide compound, silver and silver alloy, copper and copper alloy, gold and the like can be enumerated, which is in the form of a single layer or a stack of at least two layers. Among these, an indium-tin oxide compound or tin-antimony oxide compound is well suited in terms of environmental stability or circuit workability.

The thickness of the transparent conductive thin film is preferably 4–800 nm, and particularly preferably 5–500 nm. If the thickness of the transparent conductive thin film is smaller than 4 nm, formation of continuous thin film and provision of good conductivity become difficult. A thickness greater than 800 nm tends to lower transparency.

Examples of a method of forming the transparent conductive thin film of the present invention include vacuum deposition, sputtering, CVD, ion plating, and spraying, although the method can be appropriately used according to a required thickness.

For example, in the case of sputtering, a general sputtering method using an oxide target, or a reactive sputtering using a metal target and the like may be used. In this case, as a reactive gas, oxygen, nitrogen, moisture vapor and the like may be introduced, or ozone addition, plasma irradiation, ion assisting and the like may be used in combination. Further, insofar as the object of the present invention is not adversely affected, a bias such as direct current, alternating current, and high frequency may be applied to a substrate.

A temperature in forming the transparent conductive thin film on the transparent plastic film through the cured layer is preferably not higher than 150° C. The temperature exceeding 150° C. during film formation requires extremely low feeding speed of the plastic film, which is unsuitable in terms of industrial application.

A vacuum for sputtering is preferably 0.01–13.0 Pa. If the vacuum exceeds 0.01 Pa, stable discharge and hence stable sputtering cannot be performed. If the vacuum is below 13.0 Pa, similarly, stable discharge and hence stable sputtering are not performed. This also applies to other methods such as deposition and CVD.

To provide greater adhesion of the transparent conductive thin film and the cured layer, it is effective to finish the cured layer. Specifically, a discharge method irradiating glow or corona discharge to increase carbonyl group, carboxyl group and hydrogen group, or a chemicalization process treating with acid or alkali to increase polar group such as amino group, hydrogen group and carbonyl group can be enumerated.

Since the transparent conductive film of the present invention has a transparent conductive layer formed on the cured layer having irregularities obtained by utilizing phase separation, surface irregularities of the cured layer also appear in the transparent conductive layer. Specifically, 3–200 protrusions, each having a diameter of 0.05–3.0 $\mu$m and a height of 0.01–2.0 $\mu$m, are formed over the surface of the transparent conductive thin film per 100 $\mu m^2$.

The diameter of the protrusion must be 0.05–3.0 $\mu$m, preferably 0.06–2.0 $\mu$m, and particularly preferably 0.10–1.0 $\mu$m. The height of the protrusion must be 0.005–2.00 $\mu$m, preferably 0.050–1.00 $\mu$m, and particularly preferably 0.100–0.800 $\mu$m. Further, the number of protrusions per 100 $\mu m^2$ over the surface of the transparent conductive thin film must be 3–200, preferably 10–100, and particularly preferably 20–80.

If the transparent conductive film of the present invention having the above mentioned protrusions are used for a touchpanel, excellent slidability is obtained with respect to the transparent conductive thin film of the fixed electrode. Thus, even after a 100,000 linear-sliding test with a load of 5.0N using a polyacetal pen (leading edge: 0.8 mmR), the transparent conductive thin film is not deteriorated.

If the diameter of the protrusion is smaller than 0.05 μm, if the height of the protrusion is smaller than 0.005 μm, or if the number of the protrusions is less than 3 per 100 μm², good sidability is not obtained. In this case, after the 100,000 linear-sliding test with a load of 5.0N using a polyacetal pen (leading edge: 0.8 mmR), deterioration of the transparent conductive thin film is observed and hence such size of the protrusion is not preferable. On the other hand, if the diameter exceeds 3 μm, if the height of the protrusion exceeds 2 μm, or if the number of protrusions exceeds 200 per 100 μml, an increasing effect of slidability comes to a saturation and a haze value increases. Thus, such size of the protrusion is not preferable.

The transparent conductive thin film is formed on the cured layer by a vacuum process such as sputtering, as described above. If a volatile component is contained in the cured layer and/or plastic film, such vacuum process is adversely affected.

If an indium-tin oxide compound thin film is formed by sputtering, for example, sputtered indium atoms and gas vaporized from the cured layer collide in a gas phase, whereby the energy of indium atoms decreases. As a result, the hardness and quality of the transparent conductive thin film formed on the cured layer are deteriorated.

The gas component volatilized from the cured layer is incorporated as impurities. In this case also, a transparent conductive thin film with inferior quality and hardness is formed. If a transparent conductive film with such a transparent conductive thin film with inferior quality layered thereon is used for a touchpanel, the transparent conductive thin film exhibits degradation due to wearing after 100,000 linear-sliding test with a load of 5.0N, which is not preferable.

Examples of volatile components in the cured layer include the above mentioned solvent used for coating of the cured layer, a residual photo polymerization initiator which did not contribute to ultraviolet curing reaction, and a by-product thereof.

To reduce the amount of the volatile component, it is suitable to perform a heat treatment after crosslinking reaction by ultraviolet irradiation. The temperature at the time is preferably 100–200° C. If the temperature is below 100° C., the volatile component is not effectively reduced. If the temperature exceeds 200° C., the planarity of the film is not readily maintained, which is not preferable.

Alternatively, the volatile component can be effectively reduced by exposing the film to a vacuum in a vacuum chamber for sputtering or the like. At the time, the volatile component can be more effectively reduced by increasing the temperature of a roll which is in contact, or by heating the film with an infrared heater.

In these film-forming processes, immediately before forming a film, preferably, a plastic film with a cured layer is maintained in a vacuum. The vacuum exposure enables further reduction in volatile component amount.

Having been subjected to such a process of reducing volatile component, the transparent conductive film has a volatile component amount of at most 30 ppm. As such, the transparent conductive film has a transparent conductive thin film of excellent quality. If the transparent conductive film is used for a touchpanel, degradation of the transparent conductive thin film was not seen after 100,000 linear-sliding test with a load of 5.0N with use of a polyacetal pen (leading edge: 0.8 mmR).

Further, in the present invention, since the transparent conductive thin film is provided with increased hardness, degradation of the transparent conductive thin film due to a friction with respect to a glass plate is not seen as a result of a pen sliding-resistance test when used for a touchpanel.

The metal oxide forming the transparent conductive thin film is classified as either amorphous or crystalline according to its electron diffraction image. A crystalline metal oxide is produced by heating an amorphous metal oxide. The crystalline metal oxide generally has greater hardness than the amorphous metal oxide. However, as crystallization of the metal oxide forming the conductive thin film proceeds, the conductive thin film becomes more fragile. Thus, cracks tend to be caused to the thin film after the linear-sliding test using a polyacetal pen.

To give greater hardness to the amorphous transparent conductive thin film, the following two measures are effective in forming the transparent conductive thin film.

(1) To increase the temperature of the film substrate.
(2) To eliminate impurities such as moisture in an ambient for film formation.

To give greater hardness to the transparent conducive thin film, it is important to increase the temperature of the film, which is to be a substrate. This is because migration can occur over the substrate (film) surface as evaporated particles are deposited when the transparent conductive thin film is formed, so that more stable movement in terms of energy is enabled, and the transparent conductive thin film with extremely high density can be obtained. Since the evaporated particles of the metal oxide can be deposited on the film substrate with high density, extremely high hardness can be provided.

For example, when forming the transparent conductive thin film on the film using a take-up apparatus by sputtering, the temperature of the film to be a substrate can be increased by increasing the temperature of the roll in contact with the back surface (the opposite side of the surface on which the transparent conductive thin film is formed) of the film.

The temperature in forming the transparent conductive thin film on the transparent plastic film to be a substrate is preferably 40–150° C. If the temperature at the time of film formation exceeds 150° C., the surface of the plastic film becomes soft, whereby damage is more likely to be caused to the film surface when being moved in the vacuum chamber. On the contrary, if the temperature is below 40° C., the conductive thin film with great hardness cannot be readily obtained.

For control of the roll temperature, a water passage may be provided in the roll in which a temperature-adjusted heating medium is fed. Although not particularly limited, as the heating medium, it is suitable that water, oil, ethylene glycol, or propylene glycol may be used independently or in combination.

To produce a transparent conductive thin film with great hardness, it is important to reduce the impurity such as water in the ambient for film formation as much as possible.

If the film is formed by sputtering, preferably, the pressure in a vacuum chamber is decreased down to 1.110 Pa or lower before sputtering, and then an inactive gas such as Ar and a reactive gas such as oxygen are introduced to the vacuum chamber. Then, discharge electricity is generated with a pressure ranging from 0.01–10 Pa for sputtering. This applies to other methods such as vapor deposition, CVD, and the like.

As described above, the transparent conductive film having the transparent conductive thin film with excellent quality and great hardness is obtained by reducing the impurities such as moisture in the ambient for film formation as much as possible. Thus, when the transparent conductive thin film is used for a touchpanel, degradation of the transparent conductive thin film is not seen after 100,000 linear-sliding test with a load of 5.0N with use of a polyacetal pen (leading edge: 0.8 mmR).

Further, to provide the transparent conductive thin film with greater hardness, energy may be applied after film formation by means of, e.g., heating or ultraviolet irradiation. Among these energy applying methods, heating in an oxygen ambient is suitable.

The heating temperature is preferably 150–200° C. If the temperature is below 150° C., the effect of improving the film is insufficient. On the contrary, if the temperature exceeds 200° C., planarity of the film is not readily maintained, and the degree of crystallization of the transparent conductive thin film becomes extremely high, thereby resulting in a fragile transparent conductive thin film.

The heating time is preferably 0.2–60 minutes. If the heating time is shorter than 0.2 minutes, the effect of improving the film is insufficient even with a high temperature of about 220° C. The heating time that is longer than 60 minutes is industrially unsuitable.

The ambient for heating is preferably obtained by preliminary evacuating a space to achieve a pressure of at most 0.2 Pa and then filling the space with oxygen. The pressure at the time is preferably at most the atmospheric pressure.

To provide the outermost layer (pen input surface) with greater resistance to damage when used for a touchpanel, a hardcoat layer is preferably provided on the opposite side (the pen input surface of the outermost layer when used for the touchpanel) of the surface on which the transparent conductive thin film of the transparent plastic film is formed. Preferably the hardcoat layer has a hardness of at least 2 H of a pencil hardness. The hardness smaller than 2 H is insufficient in terms of resistance to damage as a hardness of the hardcoat layer.

Preferably, the hardcoat layer has a thickness of 0.5–10 $\mu$m. If the thickness is smaller than 0.5 $\mu$m, resistance to damage is unsatisfactory. The thickness greater than 10 $\mu$m is not preferable in terms of productivity.

The composition of the curable resin used for the hardcoat layer preferably includes a functional group of acrylate, e.g., polyester resin, polyether resin, acrylic resin, epoxy resin, urethane resin, alkyd resin, spiroacetal resin, polybutadiene resin, polythiol polyene resin, oligomer or prepolymer of, e.g., (meth)acrylate of a polyfunctional compound of, e.g., polyvalent alcohol. The curable resin used for the hardcoat layer further includes as a reactive diluent in a relatively large amount, monofunctional monomer such as ethyl(meth) acrylate, ethyl hexyl(meth)acrylate, styrene, methyl styrene, N-vinyl pyrrolidone, and/or polyfunctional monomer such as trimethylolpropane tri(meth)acrylate, hexanediol(meth) acrylate, tripropylene glycol di(meth)acrylate, diethylene glycol di(meth)acrylate, pentaerythritol tri(meth)acrylate, dipentaerythritol hexa(meth)acrylate, 1. 6-hexanediol di(meth)acrylate, neopentyl glycol di(meth)acrylate.

In the present invention, urethane acrylate as an oligomer and dipentaerythritol hexa(meth)acrylate as a monomer are mixed, for example.

In particular, a compound of polyester acrylate and polyurethane acrylate is suitable. Polyester acrylate provides an extremely hard coating and hence is suitable for the hardcoat layer. However, if polyester acrylate is independently used for coating, shock-resistance tends to be low, resulting in a fragile coating. Thus, to provide the coating with shock-resistance and flexibility, polyurethane acrylate is used in combination.

More specifically, with polyurethane acrylate being used in combination with polyester acrylate, the coating is provided with greater shock-resistance and flexibility while maintaining a hardness as a hardcoat layer.

Polyurethane acrylate is blended in an amount of 30 parts by weight or lower with respect to 100 parts of polyester acrylate. If the blending amount exceeds 30 parts by weight, the coating becomes too soft and hence shock-resistance tends to be unsatisfactory.

The composition of the above curable resin can be cured by a general curing method, i.e., heating, electron ray irradiation or ultraviolet irradiation. For example, in the case of electron ray irradiation, electron rays with an energy of 50–1000 keV, and preferably 100–300 keV, is emitted from various electron ray accelerators of, e.g., a Cockcroft-Walton type, Van de Graatt type, resonance transformation type, insulating core transformer type, linear type, Dynamitron type, and high frequency type. In the case of ultraviolet ray irradiation, ultraviolet rays emitted from ultra-high pressure mercury lamp, high voltage mercury lamp, low-voltage mercury lamp, carbon arc, xenon arc, and metal halide lamp may be used.

Further, in the case of ionizing radiation for curing, as a photo polymerization initiator, acetophenones, benzophenones, Michler's benzoyl benzoate, α-amyloxyme ester, tetramethylthiuram monosulfide thioxanthenes or the like is preferably blended in the composition of the curable resin, and as a photosensitizer, n-butylamine, triethylamine, tri-n-butylphosphines or the like is preferably blended. In the present invention, it is particularly preferable to blend urethane acrylate as an oligomer and to blend dipentaerythritol hexa(meth)acrylate as a monomer.

To give anti-glare properties to the hardcoat layer, it is effective to disperse inorganic particles of, e.g., $CaCO_3$ or $SiO_2$ in the curable resin, or form irregularities over the surface of the hardcoat layer. For example, to provide irregularities, after coating a liquid containing a composition of curable resin, an embossing film having protrusions over the surface is laminated and ultraviolet rays are directed from above the embossing film to cure the curable resin, and then only the embossing film is removed.

As the above mentioned embossing film, a base film of for example polyethylene terephthalate (hereinafter abbreviated as PET) having releasability with desired protrusions, or a base film of for example PET having a layer with fine protrusions may be used. The protruding layer may be obtained by coating a resin composition of inorganic particles and binder resin on the base film. For the binder resin, for example, acrylic polyol crosslinked by polyisocyanate is used. As the inorganic particle, $CaCO_3$ or $SiO_2$ may be used. Further, PET of a mat type mixed with inorganic particles of for example $SiO_2$ at the time of PET fabrication may be used.

When the coating of the ultraviolet-curable resin is laminated with the embossing film and then ultraviolet rays are directed to cure the coating, in the case of the base film having PET as the embossing film, the short wavelength side of the ultraviolet rays is absorbed by the film, so that the ultraviolet-curable resin would not be fully cured. Thus, the embossing film which is laminated on the coating of the ultraviolet-curable resin must have a transmittance of at least 20%.

In order to further improve transmittance of visible rays when used for the touchpanel, a treatment for low reflection may be performed on the hardcoat layer. In the treatment for low reflection, a material having a refractive index which differs from that of the hardcoat layer is preferably layered in a single form or in a structure of at least two layers. In the case of the single layer, a material having a refractive index smaller than that of the hardcoat layer is preferably used. In the case of a multilayer structure of at least two layers, the layer which is adjacent to the hardcoat layer has a material having a refractive index greater than that of the hardcoat layer, and a material having a refractive index smaller than that of the hardcoat layer is used for the layer thereabove. The material used for the treatment for low reflection is not particularly limited insofar as it satisfies the conditions of the above refractive indices and may be either an organic or inorganic material. For example, a dielectric material of, e.g., $CaF_2$, $MgF_2$, $NaAlF_4$, $SiO_2$, $ThF_4$, $ZrO_2$, $Nd_2O_3$, $SnO_2$, $TiO_2$, $CeO_2$, ZnS, or $In_2O_3$, is preferably used.

The treatment for low reflection may be a dry coating process such as vacuum deposition, sputtering, CVD, ion plating, or a wet coating process such as gravure method, reverse method, or die coating method.

Prior to a process of treatment for low reflection, well known finishing processes such as corona discharge, plasma treatment, sputter etching, electron beam irradiation, ultraviolet ray irradiation, primer treatment, or soft adhesion treatment may be performed on the hardcoat layer.

The use of the transparent conductive film of the present invention that is layered on the transparent resin sheet with a tackifier on the surface without the transparent conductive thin film provides a transparent conductive layer sheet for a fixed electrode of the touchpanel. Namely, the use of resin for the fixed electrode rather than glass enables manufacture of a touchpanel which is light in weight and which does not easily break up.

Although not particularly limited insofar as provided with transparency, for the tackifier, acrylic adhesive, silicone adhesive, rubber adhesive or the like is suitable. Although the thickness of the tackifier is not particularly limited, it is generally desirable that the thickness is 1–100 μm. If the thickness of the tackifier is smaller than 1 μm, practical adhesion is not easily obtained. The thickness exceeding 100 μm is not preferable in terms of productivity.

The transparent resin sheet applied through the tackifier is used for the purpose of giving a mechanical strength equivalent to that of glass. The thickness of the transparent resin sheet is preferably 0.05–5.0 mm. The thickness of the transparent resin sheet smaller than 0.05 mm is insufficient in mechanical strength as compared with glass. The thickness exceeding 5.0 mm is too thick to be used for a touchpanel. The material of the transparent resin sheet may be the same as that of the transparent plastic film.

Figure 13:
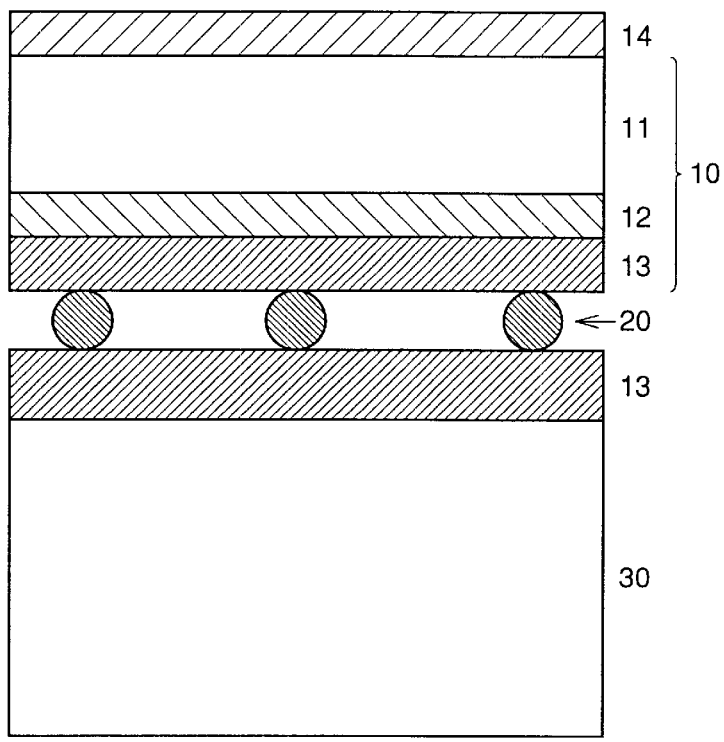
FIG. 13 is a cross sectional view of a touchpanel obtained with use of a transparent conductive film of the present invention.

FIG. 13 shows an exemplary touchpanel with a transparent conductive film (10) of the present invention. In the touchpanel having a pair of panel plates that has transparent conductive film (10) including a cured layer (12) and a transparent conductive thin film (13) layered on a transparent plastic film (11), arranged through a spacer (20), e.g., a bead, such that the transparent conductive thin films are opposite each other, the transparent conductive film (10) of the present invention is used for one of the panel plates. Note that a hardcoat layer (14) is layered on the side of transparent plastic film (11) that is opposite to cured layer (12). In the touchpanel, when a character is input by a pen, the pressure of the pen brings the opposite transparent conductive thin films to be in contact with each other, so that the device is electrically turned on for detecting the position of the pen over the touchpanel. By successively and precisely detecting the position of the pen, characters can be recognized with movement of the pen. At the time, if the transparent conductive film of the present invention is used for a movable electrode on the side in which the pen is used, excellent resistance to pen input is provided, whereby the touchpanel can be stably used over a long period of time.

Figure 14:
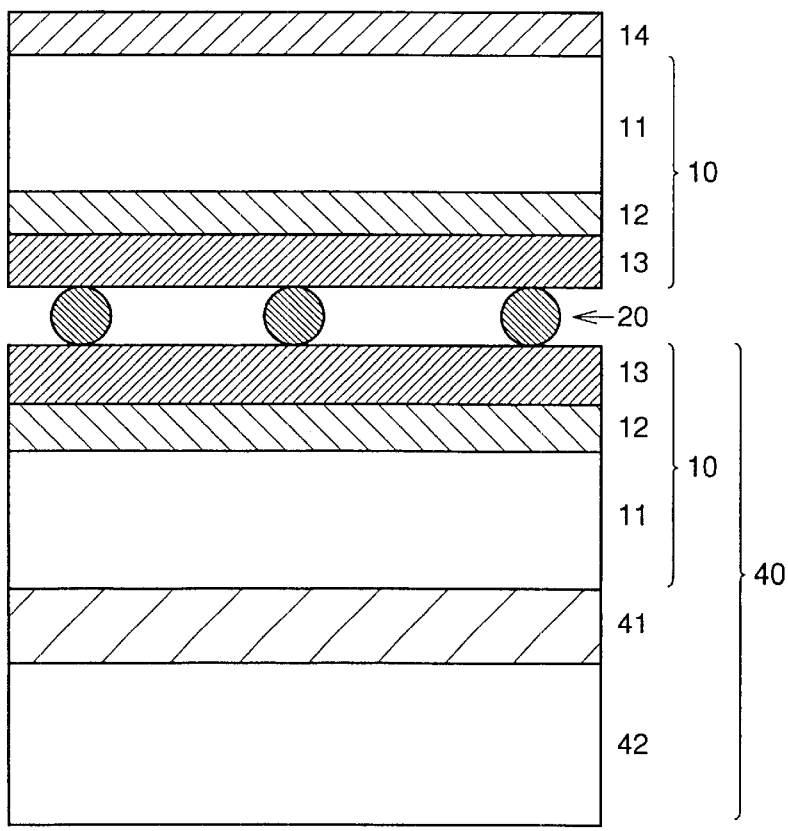
FIG. 14 is a cross sectional view of a touchpanel formed of plastic which does not employ a glass plate obtained by using a transparent conductive film and a transparent conductive sheet of the present invention.

Note that FIG. 14 shows a cross sectional view of a plastic touchpanel not provided with a glass substrate obtained by using transparent conductive film (10) and transparent conductive sheet (40) of the present invention. Since the plastic touchpanel does not use glass plate (30) in FIG. 13, it is extremely light in weight and has sufficient shock-resistance. Here, transparent resin sheet (42) of transparent conductive sheet (40) and transparent plastic film (11) are bonded by a tackifier.

EXAMPLES

The present invention will now be described in further detail with examples. The present invention is not limited by the examples. Note that the test for determining performance of the transparent conductive film and resistance to pen input of the touchpanel was conducted in the following way.

<Light Ray Transmittance and Haze>

In accordance with JIS-K7105, NDH-1001DP manufactured by Nippon Denshoku Industries Co., Ltd. was used for measuring light ray transmittance and haze.

<Surface Resistance>

In accordance with JIS-K7194, measurement was carried out by 4-terminal method. For the measurement, a Lotest AMCP-T400 manufactured by Mitsubishi Oil Co., Ltd. was used.

<Number of Protrusions over Surface>

Using a scanning electron microscope (S-800 manufactured by Hitachi, Ltd.), the surface of the film on the side of the transparent conductive thin film was observed. The picture of the film surface was taken to determine the number of protrusions per 100 $\mu m^2$ over the film surface at ten positions, and the average value was determined as the number of protrusions.

<Diameter and Height of Protrusion>

The diameter and height of the protrusion over the surface of the film on the side of the transparent conductive thin film was measured with use of a scanning probe microscope (SPA300 manufactured by Seiko Instruments). Measurement was performed for 50 protrusions, and the average value was determined. For a scanner, a 100 micron scanner was used and atomic force microscope observation was carried out under the following conditions.

Cantilever: SI-DF3 (silicon spring constant: about 2N/m).

Scan mode: DFM mode

Scan speed: 0.5–2.0 Hz

Pixel number: 512 pixels×256 pixels

Measuring environment: ambient (temperature 20° C.×moisture content 65% RH)

<Coefficient of Dynamic Friction>

In accordance with JIS-P8147, the coefficient of dynamic frictions of the surface of ITO of glass (a 450 Ω/□ product manufactured by Nippon Soda Co., Ltd.) obtained by layering an indium-tin oxide compound (ITO) thin film and the transparent conductive thin film of the transparent conductive film of the present invention were measured with a load of 43.1N (4.4 kgf) at a drawing speed of 200 m/min.

<Volatile Component Amount>

The transparent conductive film weighing 3 g was cut into strips each having a size of 3 cm×0.5 cm. The strips were subjected to a heating and elimination process in He for 15 minutes at 100° C. using a solid purge and trap apparatus (JHS-100 manufactured by Japan Analytical Industry Co., Ltd.). The eliminated component was cold-trapped to an adsorbent (quartz wool) which had been cooled by a liquid nitrogen, and then introduced to GC-MS apparatus (HP6890 and HP5973 manufactured by Hewlett-Packard Co.) by rapidly heating. Then, the volatile component amount in the transparent conductive film was determined.

<Adherence Measurement>

An ionomer film with a thickness of 40 μm was laminated onto a polyethylene terephthalate film with a thickness of 75 μm using a polyester adhesive to provide a layered stack for adherence measurement. The ionomer surface of the layered stack for adherence measurement and the transparent conductive thin film surface of the transparent conductive film were placed opposite each other and heat-sealed at 130° C. The layered stack for adherence measurement and the transparent conductive film were separated by a 180° degree peeling method and the peeling strength force was determined as an adherence. Then, the separation speed was 1000 mm/min.

<Test for Endurance to Pen Input>

A load of 5.0N was applied to a polyacetal pen (leading edge: 0.8 mmR) to perform a 100,000 (50, 000 round trips) sliding test on the touchpanel. Then, a sliding distance was 30 mm and a sliding speed was 60 mm/second. After the endurance test, visible inspection was performed to see if the sliding portion was subjected to whitening. Further, a circle having a size of 20 mmφ was written with a pen load of 0.5N on the sliding portion, and it was evaluated if the touchpanel could correctly read the circle. Further, an ON resistance (a resistance value when the movable electrode (film electrode) and the fixed electrode are in contact) was measured when the sliding portion was pressed with a pen load of 0. 5N.

<Average Molecular weight>

Polyester resin in an amount of 0.03 g was dissolved in 10 ml tetrahydrofuran. Measurement was carried out using a GPC-LALLS apparatus low angle light scattering photometer LS-8000 (tetrahydrofuran solvent, reference: polystyrene manufactured by Tosoh Corporation).

<Hardness of Transparent Conductive Thin Film Surface of Transparent Conductive Film>

A sample of transparent conductive film was cut into pieces each having a size of 7 mm×7 mm and the side opposite to the transparent conductive thin film was fixed to an aluminum sample holder by a 2-liquid mixture epoxy adhesive. Using a Nano Indenter XP (manufactured by Toyo Corporation), the transparent conductive thin film surface of the transparent conductive film was measured for hardness by a continuous rigidity measuring method with the following load excitation. For an indenter, an AccuTip type Burcovitch diamond chip having a curvature radius of 40 nm was used.

(1) Surface Detection

The indenter was lowered to the transparent conductive thin film surface of the transparent conductive film at a speed of 20 nm/second, and the portion with a rigidity 1.5 times that during free oscillation (in atmosphere) was determined as a surface.

(2) Process of Applying Load

With a loading rate of (dF/dt)/F=0.05 (F: load), the load was subjected to oscillation modulation at 45 Hz. In addition, the indenter was pushed in down to a depth of 200 nm.

(3) Process of Removing Load

A constant load was maintained for 15 minutes, and then 80% of the maximum load was removed at a speed that is 70% the ultimate speed in the load applying process.

(4) Drift Detection 50 points were measured for displacement every two seconds with a load that is 20% the maximum load, and the drift speed was calculated. Using the result, a load-displacement curve was modified.

After the completion of the above measurement, the effective contact depth of the indenter was calculated using a method of Oliver & Pharr. A preliminary obtained indenter shape correcting expression is applied to find an effective contact projective cross sectional area. The load at each measuring point was divided by the area to find hardness (GPa).

The central portion of the sample was measured at 10 points, at intervals of 40 μm, of which average value was determined. A maximum hardness was found by a graph of the hardness and depth, of which third decimal place was rounded off to obtain hardness (GPa) of the transparent conductive thin film of the transparent conductive film.

Figure 26:
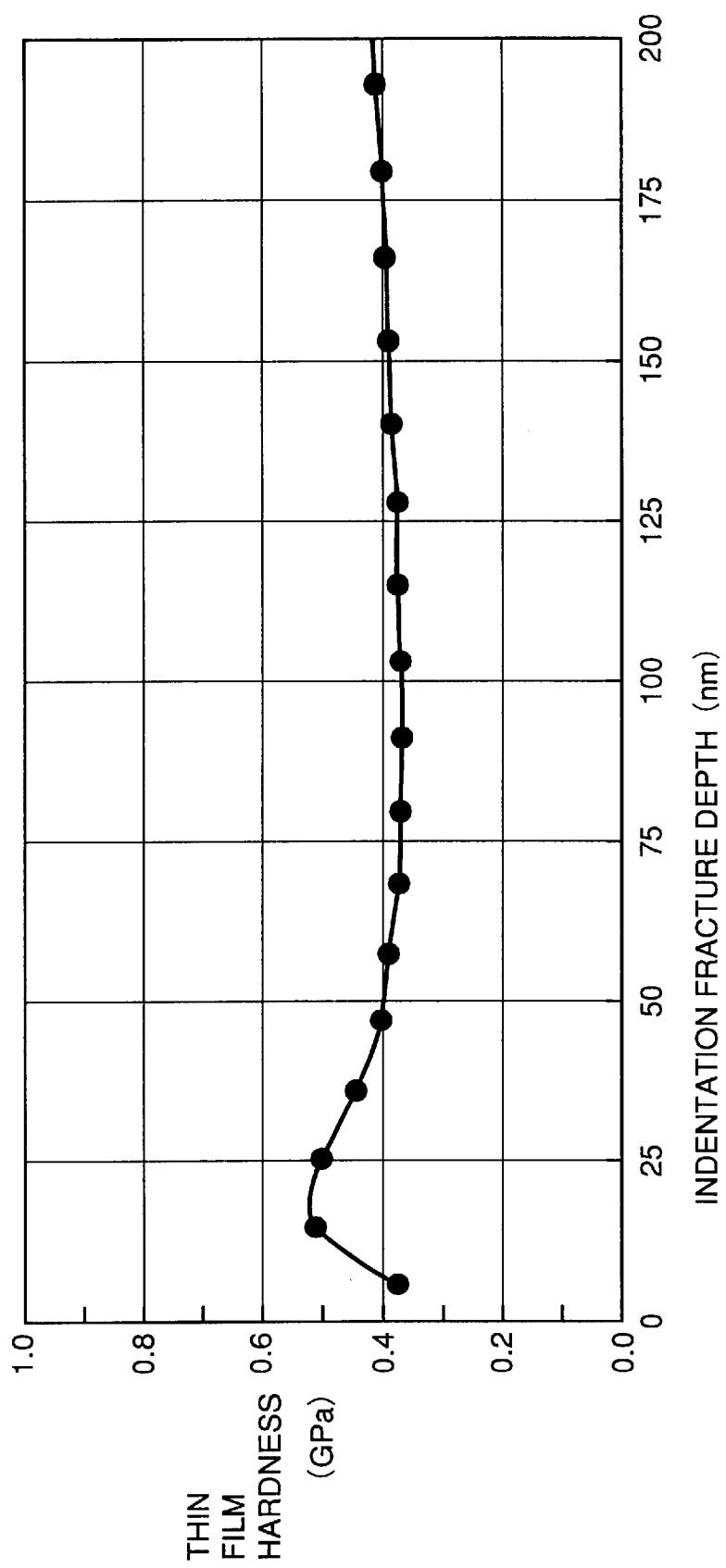
FIG. 26 is a graph showing a relationship between hardness and indentation fracture depth used for hardness measurement of the transparent conductive thin film of the fourteenth example of the present invention.

FIG. 26 is a graph showing a hardness and indentation fracture depth of the transparent conductive thin film surface of the fourteenth example. The hardness of the thin film of this case is 0.51 GPa.

<Determination of Transparent Conductive Thin Film for Crystallinity>

The transparent conductive film was soaked in 1, 1, 1, 3, 3, 3-hexafluoroisopropanol, and a plastic film and cured polymeric layer were dissolved to provide a single film of a transparent conductive thin film. Thereafter, the transparent conductive thin film in the solution was placed on a Micro-Grid and the solution was allowed to stay for air drying for a day. The dried sample was measured for the electron diffraction image by a transmission electron microscope (JEM-2010). The electron ray had an accelerating voltage of 200 kV and a wavelength of 0.0025 nm. Based on the electron diffraction image, it was determined if the transparent conductive thin film was crystalline or amorphous.

Effect of a configuration of transparent conductive film or the like (Examples 1–8, Comparative Examples 1–4).

Examples 1-3 and Comparative Examples 1 and 2

Copolymer polyester resin (Byron 200, average molecular weight: 18,000 manufactured by Toyobo Co., Ltd.) was blended in an amount shown in Table 1 with respect to 100 parts of acrylic resin containing photo polymerization initiator (Seika beam EXF-01J, manufactured by Dainichiseika Color & Chemicals Mfg. Co., Ltd.) and a mixture solvent of toluene/MEK (8/2; weight ratio) was added as a solvent to provide solid content concentration of 50% by weight to prepare a coating by agitation and uniform dissolution. The prepared coating was applied in the thickness of 5 μm on an adhesive layer of a biaxially oriented polyethylene terephthalate film (A4140, thickness: 188 μm manufactured by Toyobo Co., Ltd.) having a soft adhesion layer on one surface and dried for one minute at 80° C. Then, ultraviolet rays (light amount: 300 mJ/cm$^2$) were directed by ultraviolet irradiation apparatus (UB042-5AM-W type, manufactured by Eyegraphics, Co.) and the coating was cured.

Then, a transparent conductive thin film made of an indium-tin oxide compound was formed on the cured layer. At the time, DC electric power of 2.0 W/cm$^2$ was applied using an indium oxide containing a tin oxide in an amount of 10% by weight as a target (density: 7.1 g/cm$^3$, manufactured by Mitsui Kinzoku Co.). In addition, an Ar gas was introduced at a flow of 130 sccm, and an $O_2$ gas was introduced at a flow of 10 sccm, so that a film was formed by DC magnetron sputtering in an ambient of 0.40 Pa. However, general DC was not performed and, rather, a pulse having a width of 5 μs at +20 V was applied with a period of 50 kHz. In addition, sputtering was performed with the film being cooled by a cooling roll at −10° C. Further, while always observing an oxygen partial pressure of the ambient by a sputter process monitor (SPM200, manufactured by Hakuto Co., Ltd.), the oxygen gas was fed back to a flow meter and DC power supply source such that an oxidation degree in the indium-tin oxide compound could be kept at a constant value. Thus, a transparent conductive thin film of the indium-tin oxide compound with a thickness of 27 nm was deposited.

Further, the transparent conductive film was used as one panel plate, and a transparent conductive thin film of an indium-tin oxide compound (tin oxide content: 10% by weight) with a thickness of 20 nm formed by plasma CVD on the glass substrate was used as the other panel plate. Two panel plates were arranged such that the transparent conductive thin films were arranged opposite each other with an epoxy bead having a diameter of 30 μm interposed to provide a touchpanel.

Fourth Example

A transparent conductive thin film of a tin-antimony oxide compound was formed on a transparent plastic film base/cured layer of the second example. At the time, DC power of 1.5 W/cm² was applied using as a target (density: 5.7 g/cm³) an indium oxide containing antimony oxide in an amount of 5% by weight. An Ar gas was introduced at a flow of 130 sccm and an $O_2$ gas was introduced at a flow of 20 sccm, so that a film was formed by DC magnetron sputtering in an ambient of 0.40 Pa. Note that, general DC was not performed, but a pulse with a width of 5 μs at +20 V was applied with a period of 100 kHz to prevent arc discharge. Further, by cooling the film with a cooling roll at −10° C., sputtering was performed. While always observing by a sputter process monitor (SPM200, manufactured by Hakuto Co.) the oxygen partial pressure of the ambient, the oxygen gas was fed back to a flow meter and DC power supply source such that an oxidation degree in the indium-tin oxide compound could be kept at a constant value. Thus, a transparent conductive thin film of a tin-antimony oxide compound with a thickness of 30 nm was deposited.

The test result for performance of the obtained transparent conductive film is shown in Table 1. As in the second example, a touchpanel was manufactured.

Fifth Example

An ultraviolet curable resin (EXG, manufactured by Dainichiseika Color & Chemicals Mfg. Co., Ltd.) of a mixture of polyester acrylate and polyurethane acrylate was applied by a gravure reverse method to form a film with thickness of 5 μm (when dried) as a hardcoat layer resin on the side opposite the cured layer surface of a stack including a transparent plastic film base/cured layer of the second example, and the solvent was dried. Thereafter, it was transported at a speed of 10 m/min below an ultraviolet irradiation apparatus of 160 W to cure the ultraviolet curable resin, so that a hardcoat layer was formed.

As in the fourth example, a tin-antimony oxide compound was formed on the cured layer of a stack including the hardcoat layer/transparent plastic film base/cured layer. With use of the transparent conductive film, a touchpanel was manufactured as in the second example.

Sixth Example

As in the second example, a stack of the transparent plastic film base/cured layer was manufactured. On the side opposite the cured layer of the stack, as hardcoat layer resin, an ultraviolet curable resin (EXG manufactured by Dainichiseika Color & Chemicals Mfg. Co., Ltd.) of a mixture of polyester acrylate and polyurethane acrylate was applied by a gravure reverse method to have a thickness of 5 μm (when dried), and the solvent was dried. Thereafter, a mat embossing film (X, manufactured by Toray Industries, Inc.) was laminated such that the mat surface was brought into contact with the ultraviolet curable resin, which film was of a polyethylene terephthalate film having fine protrusions over its surface. The surface of the mat embossing film had an average surface roughness of 0.40 μm, and average interval of protrusions of 160 μm and maximum surface roughness of 25 μm. Thus obtained laminated film was transported below the ultraviolet irradiation apparatus of 160 W at a speed of 10 m/min to cure the ultraviolet curable resin. Thereafter, the mat embossing film was separated to form a hardcoat layer with recesses over its surface and having an anti-glare effect.

As in the fourth example, a transparent conductive thin film of a tin-antimony oxide compound thin film was formed on the cured layer of a stack including the anti-glare hardcoat layer/transparent plastic film base/cured layer. In addition, the transparent conductive film was used as one panel plate, and a touchpanel was manufactured as in the second example.

Seventh Example

As in the sixth example, a stack of the anti-glare hardcoat layer/transparent plastic film base/cured layer/transparent conductive thin film layer was manufactured. Then, $TiO_2$ (refractive index: 2.30, thickness: 15 nm), $SiO_2$ (refractive index: 1.46, thickness: 29 nm), $TiO_2$ (refractive index: 2.30, thickness: 109 nm), and $SiO_2$ (refractive index: 1.46, thickness: 87 nm) were successively layered on the anti-glare hardcoat layer to form an antireflection layer. To form a $TiO_2$ thin film, titanium was used as a target, and Ar and $O_2$ gases were respectively introduced at flow speeds of 500 sccm and 80 sccm with a vacuum of 0.27 Pa by direct current magnetron sputtering. With a cooling roll having a surface temperature of 0° C. being provided on the back surface of the substrate, the transparent plastic film was cooled. At that time, power of 7.8 W/cm² was supplied to the target, and a dynamic rate was 23 nm·m/min.

The $SiO_2$ thin film was formed by direct current magnetron sputtering using silicon as a target, with the vacuum maintained at 0.27 Pa and Ar and $O_2$ gases were respectively introduced at flow speeds of 500 sccm and 80 sccm. The cooling roll at 0° C. was provided at the back surface of the substrate and the transparent plastic film was cooled. Electric power of 7.8 W/cm² was supplied to the target, and a dynamic rate was 23 nm·m/min. The transparent conductive film was used as one panel plate and a touchpanel was manufactured as in the second example.

Eighth Example

The transparent conductive film manufactured as in the fourth example was attached to a polycarbonate sheet having a thickness of 1.0 mm through acrylic tackifier to provide a transparent conductive layered stack sheet. The transparent conductive layered stack sheet was used as a fixed electrode, and the transparent conductive film of the sixth example was used as a movable electrode to manufacture a touchpanel as in the second example.

Third Comparative Example

A cured layer containing silica fine particles was manufactured instead of a polyester resin. Monodispersed silica fine particles (SEAHOSTAR KE-P150, manufactured by Nippon Shokubai Co., Ltd.) having an average particle size of 1.5 μm was added in an amount of 0.5 parts by weight with respect to 100 parts of acrylic resin (Seika beam EXF-01J, manufactured by Dainichiseika Color & Chemicals Mfg. Co., Ltd.) containing a photo polymerization initiator, while toluene is added in an amount of 80 parts by weight as a solvent, which is then agitated to prepare a coating with uniformly dispersed silica fine particles. The prepared coating was applied using a Meyer bar to have a thickness of 5 μm on the adhesive layer of a biaxially oriented polyethylene terephthalate film (A4140, thickness 188 μm, manufactured by Toyobo Co., Ltd.) having a soft adhesion layer on one surface, which is dried for one minute at 80° C. Thereafter, ultraviolet rays (light amount: 300 mJ/cm$^2$) were directed to cure the coating using the ultraviolet irradiation apparatus (UB042-5AM-W type, manufactured by Eyegraphics, Co.). A tin-antimony oxide compound thin film was formed as in the fourth example on the resultant cured layer of the transparent plastic film base. Further, using the transparent conductive film, a touchpanel was manufactured as in the second example.

Fourth Comparative Example

An alcohol solution (concentration: 1% by weight) of a mixture of butanol and isopropanol of an organosilicon compound was applied to the adhesive layer of the biaxially drawn polyethylene terephthalate film (A4140, thickness: 188 μm, manufactured by Toyobo Co., Ltd.) having on its one surface a soft adhesion layer as in the first example and dried for one minute at 100° C. Then, using an indium-tin alloy target containing tin oxide in an amount of 5% by weight, a film was formed on the organosilicon compound with a substrate temperature of 120° C. The vacuum was 0.27 Pa, and Ar and O$_2$ gases were respectively introduced at flow rates of 130 sccm and 40 sccm. Power of 1.5 W/cm$^2$ was applied to the target. After the film formation, a heat treatment is performed at 150° C. for ten minutes to provide a crystalline indium-tin oxide compound thin film. With use of the transparent conductive film, a touchpanel was manufactured as in the second example.

Figure 15:
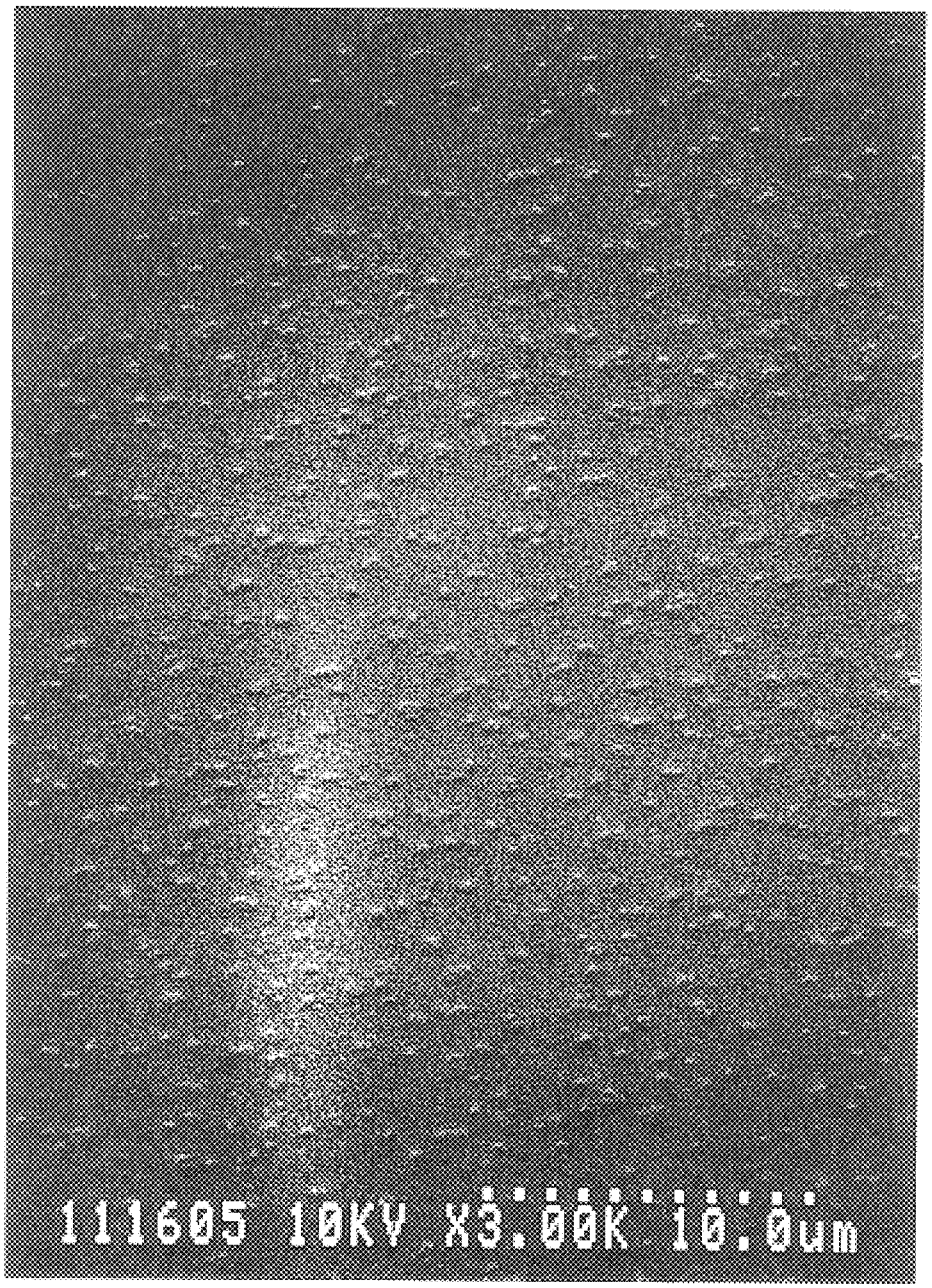
FIG. 15 is a picture taken by a scanning-type electronic microscope showing a transparent conductive thin film surface in a transparent conductive film of the fourth example.
Figure 16:
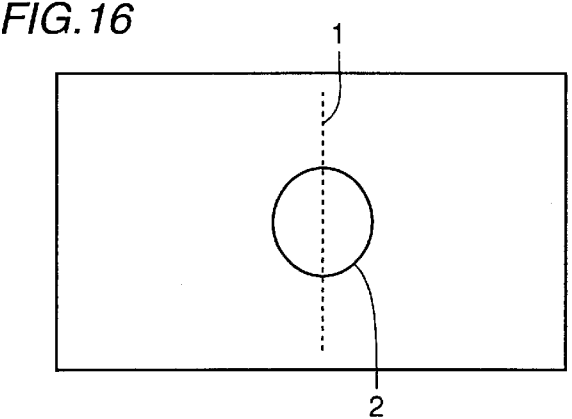
FIGS. 16 to 25 are diagrams respectively showing output shapes from a touchpanel according to ninth to eighteenth examples of the present invention.
Figure 17:
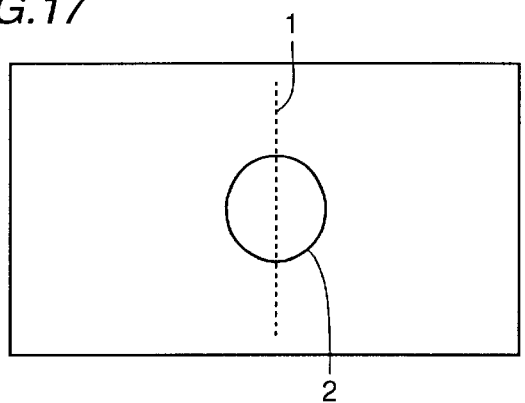
Figure 18:
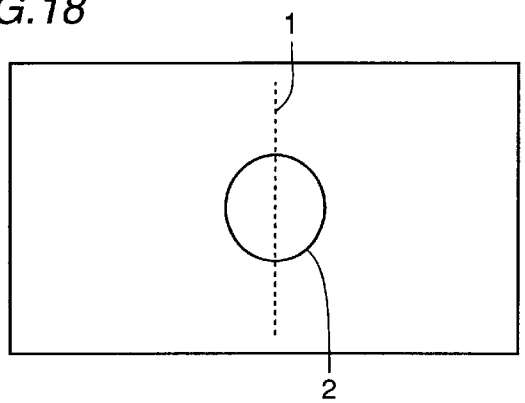
Figure 19:
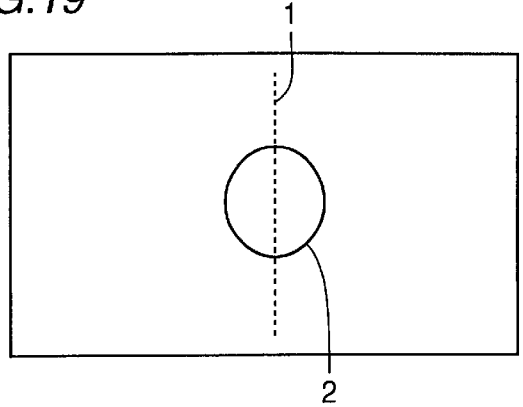
Figure 20:
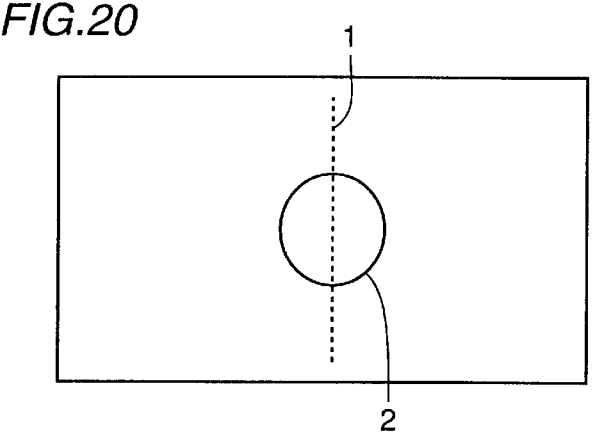
Figure 21:
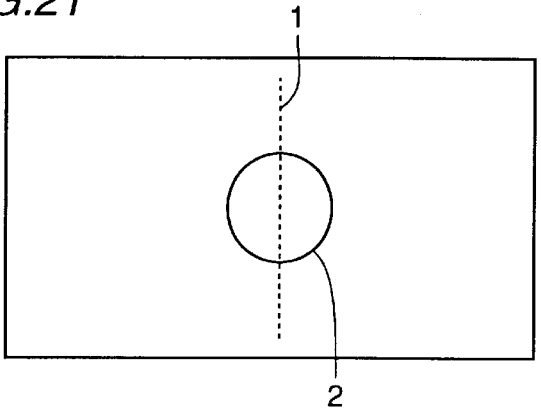
Figure 22:
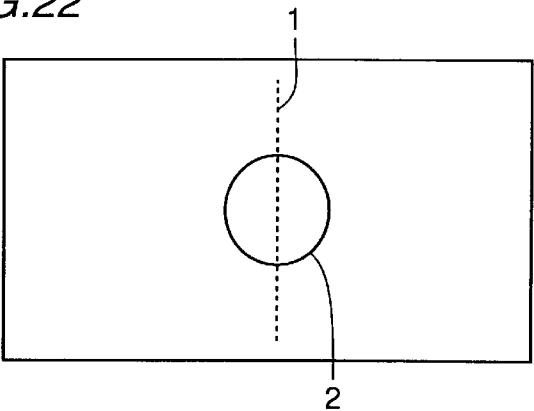
Figure 23:
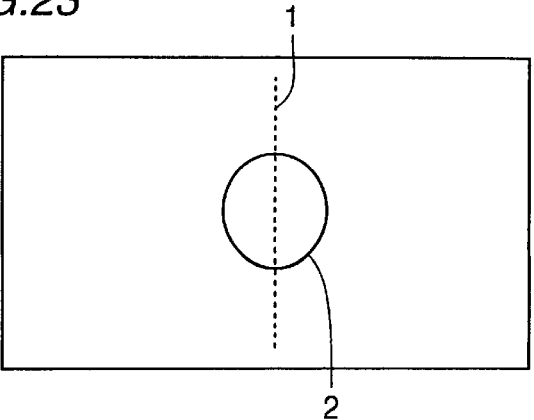
Figure 24:
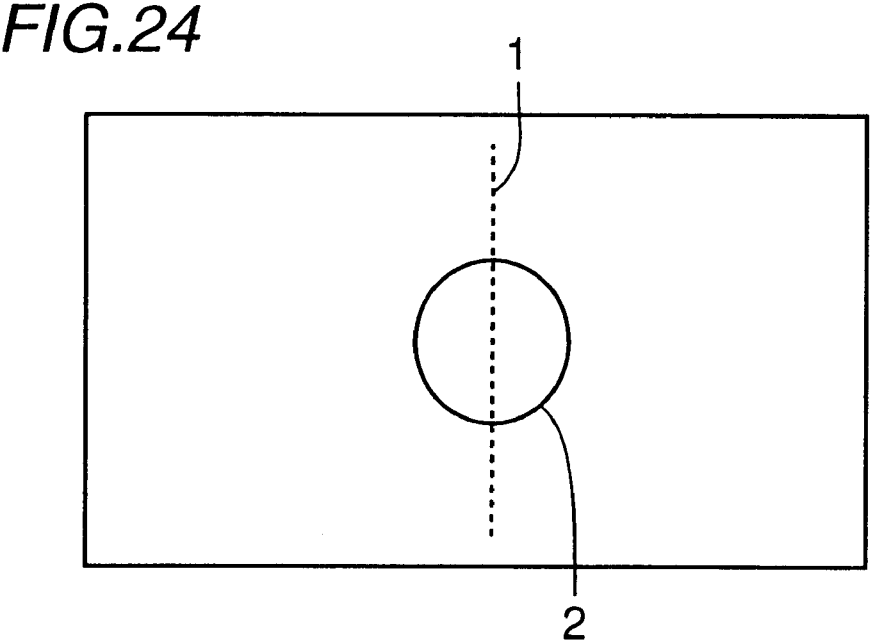
Figure 25:
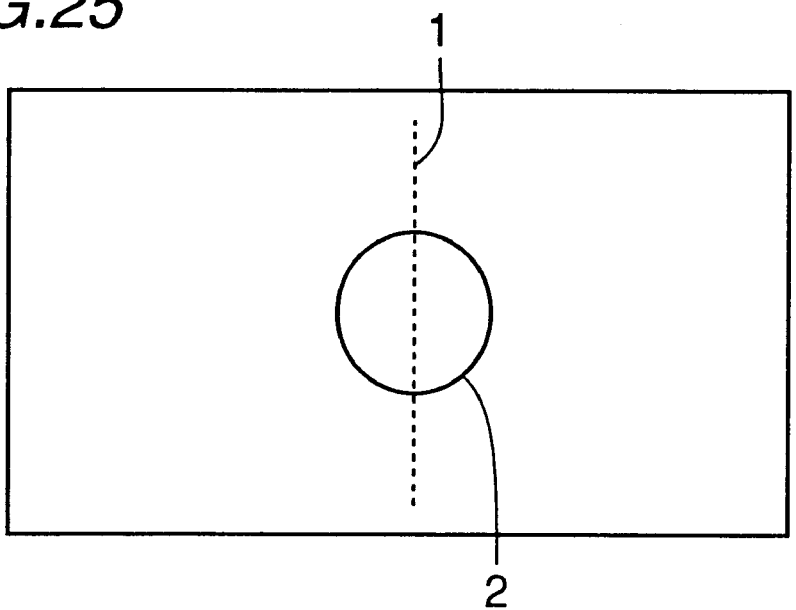

The measurement results of the foregoing examples and comparative examples are shown in Table 1 and in FIGS. 1 to 12. FIG. 15 shows a surface configuration observed by a scanning type electronic microscope over the transparent conductive thin film surface of the transparent conductive film in the fourth example.

As is apparent from the result shown in Table 1, the transparent conductive films of the present invention having a specific number of protrusions with specific configuration (diameter and height) over the transparent conductive thin film surface according to the first to eighth examples exhibited low Haze values and good transparency. Further, since the touchpanel using the transparent conductive film is superior in slidability because of its protrusions over the surface, even after 100,000 sliding test with a load of 5.0N using a polyacetal pen (leading edge: 0.8 mmR), whitening did not occur at a sliding portion (denoted by reference numeral 1 in FIGS. 1 to 8) and an ON resistance was not deteriorated. In addition, the input circle mark was properly recognized.

On the other hand, the transparent conductive film of the first comparative example had protrusions of the transparent conductive thin film with a diameter, height and the number which are all smaller than the lower limits of the present invention. As such, although it had excellent transparency, because of its poor slidability due to protrusions, when used for the touchpanel, whitening occurred at the sliding portion (reference numeral 1 in FIG. 9) after 100,000 sliding test with a load of 5.0N using a polyacetal pen (leading edge: 0.8 mmR), and an ON resistance increased. In addition, the input circle mark was not properly recognized at the sliding portion.

The transparent conductive film of the second comparative example with protrusions of the transparent conductive thin film having a diameter, height and the number which are all greater than the upper limits of the present invention was inferior in transparency and exhibited a high haze value.

The transparent conductive film of the third comparative example with silica particles added to the cured layer exhibited a high haze value, extremely large protrusions and inferior slidability. Thus, when used for the touchpanel, whitening occurred at the sliding portion (reference numeral 1 in FIG. 11) after 100,000 sliding test with a load of 5.0N using a polyacetal pen (leading edge: 0.8 mmR), and an ON resistance increased. In addition, the input circle mark was not properly recognized at the sliding portion.

When the crystalline indium-tin oxide compound thin film was used and the transparent conductive film of the fourth comparative example not having protrusions over the transparent conductive thin film surface was used for the touchpanel, whitening was not observed at the sliding portion (reference numeral 1 in FIG. 12) after 100,000 sliding test with a load of 5.0N using a polyacetal pen (leading edge: 0.8 mmR), but an ON resistance increased. In addition, the input circle mark was not properly recognized at the sliding portion. This is because the sidability was deteriorated since the transparent conductive thin film surface did not have any protrusion and cracks occurred by the sliding test.

TABLE 1

| | Composition of cured layer (parts by weight) | | | Protrusion over transparent conductive thin film surface | | | Transparent conductive film | | | | Endurance test by pen input | | |
|---|---|---|---|---|---|---|---|---|---|---|---|---|---|
| | Acrylic resin containing photo poly-merization initiator | Poly-ester resin | Silica fine particle | Dia-meter (μm) | Height (μm) | Number (number/ 100 μm$^2$) | Light transmit-tance (%) | Haze (%) | Surface resis-tance (Ω/□) | Coeffi-cient of dynamic friction | Initial Whitening at sliding portion | Initial resis-tance (kΩ) | ON resistance after test |
| Example 1 | 100 | 0.20 | — | 0.20 | 0.010 | 10 | 88.3 | 0.80 | 450 | 3 | None | 2.0 | 2.0 |
| Example 2 | 100 | 3.0 | — | 0.80 | 0.030 | 60 | 88.1 | 1.2 | 450 | 0.8 | None | 2.0 | 2.0 |

TABLE 1-continued

| | Composition of cured layer (parts by weight) | | | Protrusion over transparent conductive thin film surface | | | Transparent conductive film | | | Endurance test by pen input | | |
|---|---|---|---|---|---|---|---|---|---|---|---|---|
| | Acrylic resin containing photo polymerization initiator | Polyester resin | Silica fine particle | Diameter (μm) | Height (μm) | Number (number/ 100 μm²) | Light transmittance (%) | Haze (%) | Surface resistance (Ω/□) | Coefficient of dynamic friction | Initial Whitening at sliding portion | resistance (kΩ) | ON resistance after test |
| Example 3 | 100 | 9.0 | — | 2.5 | 0.150 | 150 | 87.9 | 1.7 | 450 | 0.5 | None | 2.0 | 2.0 |
| Comparative example 1 | 100 | 0.05 | — | 0.04 | 0.004 | 2 | 88.2 | 0.50 | 450 | 9 | Yes | 2.0 | 500 |
| Comparative example 2 | 100 | 30 | — | 3.5 | 2.50 | 300 | 87.6 | 15 | 450 | 0.1 | None | 2.0 | 2.1 |
| Example 4 | 100 | 3.0 | — | 0.80 | 0.030 | 60 | 87.7 | 1.2 | 1500 | 0.8 | None | 2.8 | 2.8 |
| Example 5 | 100 | 3.0 | — | 0.80 | 0.030 | 60 | 88.0 | 1.2 | 1500 | 0.8 | None | 2.8 | 2.8 |
| Example 6 | 100 | 3.0 | — | 0.80 | 0.030 | 60 | 87.3 | 4.8 | 1500 | 0.8 | None | 2.8 | 2.8 |
| Example 7 | 100 | 3.0 | — | 0.80 | 0.030 | 60 | 91.9 | 4.8 | 1500 | 0.8 | None | 2.8 | 2.8 |
| Example 8 | 100 | 3.0 | — | 0.80 | 0.030 | 60 | 87.3 | 1.4 | 1500 | 0.8 | None | 2.8 | 2.8 |
| Example 3 | 100 | — | 0.5 | 4.0 | 1.00 | 2 | 87.1 | 4.2 | 1500 | 8 | Yes | 2.8 | >1000 |
| Example 4 | 100 | — | — | — | — | — | 87.8 | 0.90 | 400 | 7 | None | 2.0 | 3.0 |

Ninth Example

Copolymer polyester resin (Byron 200, average molecular weight: 18,000, manufactured by Toyobo Co., Ltd.) was blended in an amount of 3 parts by weight with respect to 100 parts of acrylic resin containing photo polymerization initiator (Seika beam EXF-01J, manufactured by Dainichiseika Color & Chemicals Mfg. Co., Ltd.) and a mixture solvent of toluene/MEK (8/2; weight ratio) was added as a solvent to provide solid content concentration of 50% by weight to prepare a coating by agitation and uniform dissolution. The prepared coating was applied to have a thickness of 5 μm on an adhesive layer of a biaxially oriented polyethylene terephthalate film (A4340, thickness: 188 μm manufactured by Toyobo Co., Ltd.) using a Meyer bar, which was then dried for one minute at 80° C. Thereafter, ultraviolet rays (light amount: 300 mJ/cm²) were directed by ultraviolet irradiation apparatus (UB042-5AM-W type, manufactured by Eyegraphics, Co.) and the coating was cured. Then, a heat treatment was performed at 180° C. for one minute to reduce volatile component.

To perform vacuum exposure on the plastic film with the cured layer, a rollback process was performed in a vacuum chamber. The pressure at the time was 0.002 Pa and the exposure time was 10 minutes. The temperature of the center roll was 40° C.

Then, a transparent conductive a transparent conductive thin film made of an indium-tin oxide compound was formed on the cured layer. At the time, DC electric power of 2 W/cm² was applied using a tin oxide in an indium oxide in an amount of 5% by weight as a target (density: 7.1 g/cm³, manufactured by Mitsui Kinzoku Co.). In addition, an Ar gas was introduced at a flow of 130 sccm, and an O₂ gas was introduced at a flow of 10 sccm, so that a film was formed by DC magnetron sputtering in an ambient of 0.4 Pa. However, general DC was not performed and, rather, a pulse having a width of 5 μs with a period of 50 kHz was applied with use of PRG-100 manufactured by ENI Japan to prevent arc discharge. In addition, sputtering was performed with the temperature of the center roll maintained at 20° C.

Further, while always observing an oxygen partial pressure of the ambient by a sputter process monitor (SPM200, manufactured by Hakuto Co., Ltd.), the oxygen gas was fed back to a flow meter and DC power supply source so that an oxidation degree in the indium-tin oxide compound could kept at a constant value. Thus, a transparent conductive thin film of the indium-tin oxide compound with a thickness of 22 nm was deposited. Further, a touchpanel was manufactured using thus obtained transparent conductive film as in the first example.

Tenth Example

An ultraviolet curable resin (EXG, manufactured by Dainichiseika Color & Chemicals Mfg. Co., Ltd.) of a mixture of polyester acrylate and polyurethane acrylate was applied by a gravure reverse method to form a film with thickness of 5 μm when dried as a hardcoat layer resin on the side opposite the cured layer surface of a stack including a transparent plastic film base/cured layer of the ninth example, and the solvent was dried. Thereafter, it was transported at a speed of 10 m/min below an ultraviolet irradiation apparatus of 160 W to cure the ultraviolet curable resin, so that a hardcoat layer was formed. Then, a heat treatment was performed at 180° C. for one minute to reduce volatile component.

As in the ninth example, a indium-tin oxide compound was formed on the cured layer of a stack including the hardcoat layer/transparent plastic film base/cured layer. With use of the transparent conductive film, a touchpanel was manufactured as in the first example.

Eleventh Example

As in the ninth example, a stack of the transparent plastic film base/cured layer was manufactured. On the side opposite the cured layer of the stack, as hardcoat layer resin, an ultraviolet curable resin (EXG manufactured by Dainichiseika Color & Chemicals Mfg. Co., Ltd.) of a mixture of polyester acrylate and polyurethane acrylate was applied by a gravure reverse method to have a thickness of 5 μm when dried, and the solvent was dried. Thereafter, a mat embossing film (X, manufactured by Toray Industries, Inc.) was laminated such that the mat surface was brought into contact with the ultraviolet curable resin, which film was of a polyethylene terephthalate film having fine protrusions over its surface. The surface of the mat embossing film had an average surface roughness of 0.40 μm, and average interval of protrusions of 160 μm and maximum surface roughness of 25 μm.

Thus laminated film was transported below the ultraviolet irradiation apparatus of 160 W at a speed of 10 m/min to cure the ultraviolet curable resin. Thereafter, the mat embossing film was separated to form a hardcoat layer with recesses over its surface and having an anti-glare effect. Thereafter, a heat treatment was performed at 180° C. for one minute to reduce volatile component.

As in the ninth example, a transparent conductive thin film of an indium-tin oxide compound thin film was formed as a transparent conductive thin film on the cured layer of a stack including the anti-glare hardcoat layer/transparent plastic film base/cured layer. In addition, the transparent conductive film was used as one panel plate, and a touchpanel was manufactured as in the first example.

Twelfth Example

As in the eleventh example, a stack of the anti-glare hardcoat layer/transparent plastic film base/cured layer/transparent conductive thin film layer was manufactured. Then, $TiO_2$ (refractive index: 2.30, thickness: 15 nm), $SiO_2$ (refractive index: 1.46, thickness: 29 nm), $TiO_2$ (refractive index: 2.30, thickness: 109 nm), and $SiO_2$ (refractive index: 1.46, thickness: 87 nm) were successively layered on the anti-glare hardcoat layer to form an antireflection layer. To form a $TiO_2$ thin film, titanium was used as a target, and Ar and $O_2$ gases were respectively introduced at flow speeds of 500 sccm and 80 sccm with a vacuum of 0.27 Pa by direct current magnetron sputtering. With a cooling roll having a surface temperature of 0° C. being provided on the back surface of the substrate, the transparent plastic film was cooled. At that time, power of 7.8 W/cm² was supplied to the target, and a dynamic rate was 23 nm·m/min.

The $SiO_2$ thin film was formed by direct current magnetron sputtering using silicon as a target, with the vacuum maintained at 0.27 Pa and Ar and $O_2$ gases were respectively introduced at flow speeds of 500 sccm and 80 sccm. The cooling roll at 0° C. was provided at the back surface of the substrate and the transparent plastic film was cooled. Electric power of 7.8 W/cm² was supplied to the target, and a dynamic rate was 23 nm·m/min. The transparent conductive film was used as one panel plate and a touchpanel was manufactured as in the first example.

Thirteenth Example

The transparent conductive film manufactured as in the ninth example was attached to a polycarbonate sheet having a thickness of 1.0 mm through acrylic tackifier to provide a transparent conductive layered stack sheet. The transparent conductive layered stack sheet was used as a fixed electrode, and the transparent conductive film of the sixth example was used as a movable electrode to manufacture a touchpanel as in the first example.

Example 9A

A transparent conductive film was manufactured as in the ninth example except for a heat treatment at 180° C. for one minute and a process of vacuum exposure for reducing volatile component. Further, with use of the transparent conductive film, a touchpanel was manufactured as in the first example.

The measurement results of the above described tenth to thirteenth examples as well as example 9A are shown in Table 2, and output shapes of the ninth to thirteenth examples are shown in FIGS. 16 to 20.

Referring to Table 2, the transparent conductive films of the ninth to thirteenth examples provides transparent conductive thin films of good quality with reduced amount of volatile components. Whitening was not caused to the touchpanel with the transparent conductive film even after 100,000 sliding test with a load of 5.0N using a polyacetal pen (leading edge: 0.8 mmR), and an On resistance was not deteriorated. In addition, the input circle mark was properly recognized.

On the other hand, in the case of example 9A, because of its large amount of volatile component, the film had a somewhat inferior quality. When used for the touchpanel, the sliding portion was slightly whitened after 100,000 sliding test with a load of 5.0N using a polyacetal pen (leading edge: 0.8 mmR), and an ON resistance increased. In addition, the recognition accuracy of the input circle mark at the sliding portion was somewhat inferior.

TABLE 2

| | Volatile component amount (ppm) | Light ray transmittance (%) | Haze (%) | Surface resistance (Ω/□) | Adhesion (N/15 mm) | Test of endurance to pen input | | |
|---|---|---|---|---|---|---|---|---|
| | | | | | | Whitening at sliding portion | Initial ON resistance (kΩ) | ON resistance after test (k/Ω) |
| Example 9 | 0.5 | 88.1 | 1.2 | 250 | 1.5 | None | 2.0 | 2.0 |
| Example 10 | 0.5 | 88.3 | 1.2 | 250 | 1.5 | None | 2.0 | 2.0 |
| Example 11 | 0.5 | 87.5 | 5.9 | 250 | 1.5 | None | 2.0 | 2.8 |
| Example 12 | 0.4 | 89.9 | 5.9 | 250 | 1.5 | None | 2.0 | 2.8 |
| Example 13 | 0.5 | 87.3 | 1.5 | 250 | 1.5 | None | 2.0 | 2.8 |
| Example 9A | 32 | 87.8 | 1.2 | 250 | 1.5 | Some | 2.0 | 750 |

(Note)
There were 60 protrusions over the surface of the transparent conductive thin film per 100 μm² in each of the above examples each having an diameter of 0.08 μm and height of 0.30 μm.

Effect on hardness of transparent conductive thin film

Fourteenth Example

Copolymer polyester resin (Byron 200, average molecular weight: 18,000, manufactured by Toyobo Co., Ltd.) was blended in an amount of 3 parts by weight with respect to 100 parts of acrylic resin containing photo polymerization initiator (Seika beam EXF-01J, manufactured by Dainichiseika Color & Chemicals Mfg. Co., Ltd.) and a mixture solvent of toluene/MEK (8/2; weight ratio) was added as a solvent to provide solid content concentration of 50% by weight, in order to prepare a coating by agitation and uniform dissolution.

The prepared coating was applied to have a thickness of 5 μm on a biaxially oriented PET film having on both sides soft adhesion layers (A4340, thickness: 188 μm manufactured by Toyobo Co., Ltd.) using a Meyer bar, which was then dried for one minute at 80° C. Thereafter, ultraviolet rays (light amount: 300 mJ/cm$^2$) were directed by ultraviolet irradiation apparatus (UB042-5AM-W type, manufactured by Eyegraphics, Co.) and the coating was cured. Then, a heat treatment was performed at 180° C. for one minute to reduce volatile component.

To perform vacuum exposure on the plastic film with the cured layer, a rollback process was performed in a vacuum chamber. The pressure at the time was 0.002 Pa and the exposure time was 10 minutes. The temperature of the center roll was 40° C.

Then, a transparent conductive a transparent conductive thin film made of an indium-tin oxide compound was formed on the cured layer. At the time, DC electric power of 2 W/cm$^2$ was applied using a tin oxide in an indium oxide in an amount of 5% by weight as a target (density: 7.1 g/cm$^3$, manufactured by Mitsui Kinzoku Co.). In addition, an Ar gas was introduced at a flow of 130 sccm, and an O$_2$ gas was introduced at a flow of 10 sccm, so that a film was formed by DC magnetron sputtering in an ambient of 0.4 Pa. However, general DC was not performed and, rather, a pulse having a width of 5 μs with a period of 50 kHz was applied with use of PRG-100 manufactured by ENI Japan to prevent arc discharge. In addition, sputtering was performed with the temperature of the center roll maintained at 50° C.

Further, while always observing an oxygen partial pressure of the ambient by a sputter process monitor (SPM200, manufactured by Hakuto Co., Ltd.), the oxygen gas was fed back to a flow meter and DC power supply source with an oxidation degree in the indium-tin oxide compound being kept at a constant value. Thus, a transparent conductive thin film of the indium-tin oxide compound with a thickness of 22 nm was deposited. Further, the transparent conductive film was used as one panel, and a transparent conductive thin film (S500 manufactured by Nippon Soda Co., Ltd) of an indium-tin oxide compound thin film (tin oxide content: 10% by weight) with a thickness of 20 nm formed by plasma CVD on the glass substrate was used as the other panel plate. Two panel plates were arranged such that the transparent conductive thin films were arranged opposite each other with an epoxy bead having a diameter of 30 μm interposed to provide a touchpanel.

Fifteenth Example

In the fourteenth example, an ultraviolet curable resin (EXG, manufactured by Dainichiseika Color & Chemicals Mfg. Co., Ltd.) of a mixture of polyester acrylate and polyurethane acrylate was applied by a gravure reverse method to form a film with thickness of 5 μm when dried as a hardcoat layer resin on the side opposite the cured layer surface of a stack including a transparent biaxially oriented PET film base/cured layer, and the solvent was dried. Thereafter, it was transported at a speed of 10 m/min below an ultraviolet irradiation apparatus of 160 W to cure the ultraviolet curable resin, so that a hardcoat layer was formed. Then, a heat treatment was performed at 180° C. for one minute to reduce volatile component.

As in the fourteenth example, a indium-tin oxide compound thin film was formed on the cured layer of a stack including the hardcoat layer/transparent biaxially oriented film base/cured layer. With use of the transparent conductive film, a touchpanel was manufactured as in the fourteenth example.

Sixteenth Example

As in the fourteenth example, a stack of the transparent biaxially oriented PET film base/cured layer was manufactured. On the side opposite the cured layer of the stack, as hardcoat layer resin, an ultraviolet curable resin (EXG manufactured by Dainichiseika Color & Chemicals Mfg. Co., Ltd.) of a mixture of polyester acrylate and polyurethane acrylate was applied by a gravure reverse method to have a thickness of 5 μm when dried, and the solvent was dried. Thereafter, a mat embossing film (X, manufactured by Toray Industries, Inc.) was laminated such that the mat surface was brought into contact with the ultraviolet curable resin, which film was of a PET film having fine protrusions over its surface. The surface of the mat embossing film had an average surface roughness of 0.40 μm, and average interval of protrusions of 160 μm and maximum surface roughness of 25 μm.

Thus laminated film was transported below the ultraviolet irradiation apparatus of 160 W at a speed of 10 m/min to cure the ultraviolet curable resin. Thereafter, the mat embossing film was separated to form a hardcoat layer with recesses over its surface and having an anti-glare effect. Thereafter, a heat treatment was performed at 180° C. for one minute to reduce volatile component.

As in the fourteenth example, a transparent conductive thin film of an indium-tin oxide compound thin film was formed as a transparent conductive thin film on the cured layer of a stack including the anti-glare hardcoat layer/transparent biaxially oriented PET film base/cured layer. In addition, the transparent conductive film was used as one panel plate, and a touchpanel was manufactured as in the fourteenth example.

Seventeenth Example

As in the sixteenth example, a stack of the anti-glare hardcoat layer/transparent biaxially oriented PET film base/cured layer/transparent conductive thin film layer was manufactured. Then, TiO$_2$ (refractive index: 2.30, thickness: 15 nm), SiO$_2$ (refractive index: 1.46, thickness: 29 nm), TiO$_2$ (refractive index: 2.30, thickness: 109 nm), and SiO$_2$ (refractive index: 1.46, thickness: 87 nm) were successively layered on the anti-glare hardcoat layer to form an antireflection layer.

To form a TiO$_2$ thin film, titanium was used as a target, and Ar and O$_2$ gases were respectively introduced at flow speeds of 500 sccm and 80 sccm with a vacuum of 0.27 Pa by direct current magnetron sputtering. With a cooling roll having a surface temperature of 0° C. being provided on the back surface of the substrate, the transparent plastic film was cooled. At that time, power of 7.8 W/cm$^2$ was supplied to the target, and a dynamic rate was 23 nm·m/min.

The SiO$_2$ thin film was formed by direct current magnetron sputtering using silicon as a target, with the vacuum maintained at 0.27 Pa and Ar and O$_2$ gases were respectively introduced at flow speeds of 500 sccm and 80 sccm. The cooling roll at 0° C. was provided at the back surface of the substrate and the transparent plastic film was cooled. Electric power of 7.8 W/cm$^2$ was supplied to the target, and a dynamic rate was 23 nm·m/min. The transparent conductive film was used as one panel plate and a touchpanel was manufactured as in the fourteenth example.

Eigthteenth Example

The transparent conductive film manufactured as in the fourteenth example was attached to a polycarbonate sheet having a thickness of 1.0 mm through acrylic tackifier to provide a transparent conductive layered stack sheet. The transparent conductive layered stack sheet was used as a fixed electrode, and the transparent conductive film of the fifteenth example was used as a movable electrode to manufacture a touchpanel as in the fourteenth example.

Example 14A

A transparent conductive film was manufactured as in the fourteenth example except that a heat treatment at 180° C. for one minute and a process of reducing volatile component by a vacuum exposure for 10 minutes were not performed. Further, with use of the transparent conductive film, a touchpanel was manufactured as in the fourteenth example.

Example 14B

A touchpanel was manufactured as in the fourteenth example except that a heat treatment was performed at 210° C. for one minute was performed.

The measurement results of the above described fourteenth to eighteenth examples as well as examples 14A and 14B are shown in Table 3, and output shapes of the fourteenth to eighteenth examples are shown in FIGS. 21 to 25.

Referring to Table 3, the transparent conductive films and transparent conductive sheets of the fourteenth to eighteenth examples provide transparent conductive thin films of high hardness. Whitening was not caused to the touchpanel with the transparent conductive film even after 100,000 sliding test with a load of 5.0N using a polyacetal pen (leading edge: 0.8 mmR), and an On resistance was not deteriorated. In addition, the input circle mark was properly recognized.

On the other hand, in the case of example 14A, because of its insufficient hardness, when used for the touchpanel, the sliding portion was slightly whitened after 100,000 sliding test with a load of 5.0N using a polyacetal pen (leading edge: 0.8 mmR), and an ON resistance increased. In addition, the recognition accuracy of the input circle mark at the sliding portion was somewhat inferior.

The transparent conductive film of the example 14B was a fragile thin film because of its extremely high hardness of the transparent conductive thin film. Although whitening was not caused or an ON resistance did not increase, after 100,000 sliding test with a load of 5.0N using a polyacetal pen (leading edge: 0.8 mmR), recognition accuracy of the input circle mark at the sliding portion was inferior. This is because cracks were caused to the transparent conductive thin film due to the sliding test.

TABLE 3

|  | Hardness of thin film (GPa) | Light ray transmittance (%) | Haze (%) | Surface resistance ($\Omega/\square$) | Adhesion (N/15 mm) | Test of endurance to pen-sliding | | |
|---|---|---|---|---|---|---|---|---|
|  |  |  |  |  |  | Whitening at sliding portion | Initial resistance (k$\Omega$) | ON resistance after test (k/$\Omega$) |
| Example 14 | 0.51 | 88.3 | 0.8 | 250 | 1.5 | None | 2.0 | 2.0 |
| Example 15 | 0.51 | 88.5 | 5.9 | 250 | 1.5 | None | 2.0 | 2.0 |
| Example 16 | 0.51 | 87.3 | 5.9 | 250 | 1.5 | None | 2.0 | 2.0 |
| Example 17 | 0.51 | 89.8 | 1.5 | 250 | 1.5 | None | 2.0 | 2.0 |
| Example 18 | 0.51 | 88.1 | 1.7 | 250 | 1.5 | None | 2.0 | 2.0 |
| Example 14A | 0.34 | 88.5 | 1.2 | 250 | 1.5 | Some | 2.0 | >1000 |
| Example 14B | 0.89 | 89.2 | 0.8 | 380 | 0.5 | None | 2.0 | 2.1 |

Note
There were 60 protrusions over the surface of the transparent conductive thin film per 100 $\mu m^2$ in each of the above examples each having an diameter of 0.08 $\mu$m and height of 0.30 $\mu$m.

The transparent conductive thin film of the present invention has good slidability and transparency because of its specific number (3–200/100 $\mu m^2$) of protrusions of a specific configuration (having a diameter of 0.05–3.0 $\mu$m and a height of 0.005–2.00 $\mu$m) over the surface of the transparent conductive thin film with the cured layer mainly including a curable resin and the transparent conductive thin film successively layered on the transparent plastic film base.

Since the volatile component of the film is at most 30 ppm, a transparent conductive film of good quality can be formed. Thus, separation, cracks or the like are not caused to a touchpanel for pen input using the transparent conductive film even if the opposite transparent conductive films are brought into contact by the pen pressure.

Further, the transparent conductive film is characterized in that the hardness of the transparent conductive thin film is 0.4–0.8 Pa, so that separation, cracks or the like are not caused to a touchpanel for pen input using the transparent conductive film even if the opposite transparent conductive films are brought into contact by the pen pressure.

The touchpanel for pen input of the present invention has good resistance to pen input, e.g., separation, cracks or the like are not caused even if the opposite transparent conductive films are brought into contact by the pen pressure, and has excellent position detecting accuracy and display quality. As such, it is well suited as a touchpanel for pen input.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transparent conductive film, characterized in that the transparent conductive film includes a cured layer mainly containing a curable resin and a transparent conductive thin film successively layered on a transparent plastic film base, having 3–200 protrusions per 100 $\mu m^2$ each having a diameter of 0.05–3.0 $\mu$m and a height of 0.005–2.00 $\mu$m over a surface of said transparent conductive thin film.

2. The transparent conductive film according to claim 1, characterized in that said cured layer mainly containing the curable resin further contains a polymeric resin insoluble with the curable resin, and said insoluble polymeric resin is dispersed in a particle form.

3. The transparent conductive film according to claim 2, characterized in that said curable resin is an ultraviolet-curable resin, and the resin insoluble with the ultraviolet-curable resin is a polyester resin having an average molecular weight of 5,000–50,000, and said polyester resin is contained in an amount of 0.10–20 parts by weight with respect to 100 parts of the ultraviolet-curable resin.

4. The transparent conductive film according to claim 1, characterized in that the transparent conductive thin film of said transparent conductive film has a surface hardness of 0.4–0.8 GPa.

5. The transparent conductive film according to claim 1, characterized in that the transparent conductive film includes the cured layer mainly containing the curable resin and the transparent conductive thin film successively layered on the transparent plastic film base, and a volatile component amount of said transparent conductive film is at most 30 ppm.

6. The transparent conductive film according to claim 1, characterized in that said transparent conductive thin film is amorphous.

7. The transparent conductive film according to claim 1, characterized in that said transparent conductive thin film is formed of an indium-tin oxide compound or a tin-antimony oxide compound.

8. The transparent conductive thin film according to claim 1, characterized in that a hardcoat layer is formed on a side opposite said transparent conductive thin film of said transparent conductive film.

9. The transparent conductive film according to claim 8, characterized in that the hardcoat layer has an anti-glare effect.

10. The transparent conductive film according to claim 9, characterized in that a treatment for low reflection is performed on said hardcoat layer.

11. A transparent conductive sheet, characterized in that a transparent resin sheet is applied on a side opposite the transparent conductive thin film of the transparent conductive film according to claim 1 through a tackifier.

12. A touchpanel comprising a pair of panel plates having said transparent conductive thin films arranged such that the transparent conductive thin films are opposite each other through a spacer, characterized in that at least one of said panel plates is formed of the transparent conductive film according to claim 1.

* * * * *